US006731314B1

(12) United States Patent
Cheng et al.

(10) Patent No.: US 6,731,314 B1
(45) Date of Patent: May 4, 2004

(54) NETWORK-BASED THREE-DIMENSIONAL MULTIPLE-USER SHARED ENVIRONMENT APPARATUS AND METHOD

(75) Inventors: Gavin Cheng, San Francisco, CA (US); Jonathan Cheng, Kowloon (HK); Geoffrey F. Graber, San Francisco, CA (US); Dwayne Serjeant, Foster City, CA (US); Payton R. White, Palo Alto, CA (US); Ivan S. Fuller, Cupertino, CA (US); Mark C. Barnes, Sunnyvale, CA (US); Ralph P. Seguin, San Jose, CA (US)

(73) Assignee: Muse Corporation (VG)

( * ) Notice: Subject to any disclaimer, the term of this patent is extended or adjusted under 35 U.S.C. 154(b) by 0 days.

(21) Appl. No.: 09/375,476

(22) Filed: Aug. 16, 1999

Related U.S. Application Data

(60) Provisional application No. 60/096,884, filed on Aug. 17, 1998.

(51) Int. Cl.[7] .................................................. G09G 5/00
(52) U.S. Cl. ........................ 345/848; 345/757; 345/849; 345/850
(58) Field of Search ................................. 345/738, 744, 345/745, 746, 747, 748, 751, 752, 753, 755, 757, 758, 850, 851, 852, 419, 594, 706

(56) References Cited

U.S. PATENT DOCUMENTS

| 5,404,393 A | 4/1995 | Remillard ..................... 379/96 |
| 5,572,643 A | 11/1996 | Judson ........................ 395/793 |
| 5,644,714 A | 7/1997 | Kikinis .................. 395/200.03 |
| 5,675,721 A | 10/1997 | Freedman et al. .......... 395/129 |
| 5,708,764 A | 1/1998 | Borrel et al. ................ 395/119 |
| 5,732,232 A | 3/1998 | Brush, II et al. ........... 395/339 |
| 5,757,669 A | 5/1998 | Christie et al. ....... 364/514.006 |
| 5,768,528 A | 6/1998 | Stumm ................... 395/200.61 |

(List continued on next page.)

FOREIGN PATENT DOCUMENTS

| DE | 29915185 U1 | 11/1999 | ............. G06F/3/33 |
| WO | WO 96/34466 | 10/1996 | ............. H04H/1/00 |
| WO | WO 98/21679 | 5/1998 | ............ G06F/17/60 |
| WO | WO 98/23059 | 5/1998 | |

OTHER PUBLICATIONS

K. Mathews, "Three–Dimensional Sketching: Architectural Design Software Proposal—1988", [Internet] http://www.designlaboratory.com/faculty/matthews.kevin/mp3.02b.html, Aug. 1988.

(List continued on next page.)

*Primary Examiner*—Ba Huynh
(74) *Attorney, Agent, or Firm*—Roger Chu; Toe Zheng

(57) ABSTRACT

A client computer program provides instructions for a processor to locate and retrieve rich media and HTML files for running in a three-dimensional graphical user interface. The program provides instructions for the processor to generate a three-dimensional (3D) graphical user interface on a display. Then, the processor generates a metaphorical user object for navigating and interacting in the three dimensions within the environment via navigational and interactional inputs, respectively, from a user. The processor also integrates an HTML object into the environment, and interacts the user object with the HTML object in response to an interactional input from the user. Preferably, the processor generates one or more additional user objects for additional users. Each of the additional user objects can also interact with the HTML object, the first user object and/or each other within the environment in response to interactional inputs from the additional users. In addition, the first user object may interact with any or all of the additional user objects in response to interactional inputs from the first user. The interactional inputs may be proxy expressions from one user to another.

55 Claims, 15 Drawing Sheets

The Visualization Component Architecture

U.S. PATENT DOCUMENTS

| | | | |
|---|---|---|---|
| 5,774,670 A | 6/1998 | Montulli | 395/200.57 |
| 5,784,570 A | 7/1998 | Funkhouser | 395/200.77 |
| 5,819,285 A | 10/1998 | Damico et al. | 707/104 |
| 5,841,980 A | 11/1998 | Waters et al. | 395/200.34 |
| 5,880,731 A * | 3/1999 | Liles et al. | 345/758 |
| 5,926,179 A * | 7/1999 | Matsuda et al. | 345/752 |
| 5,956,038 A * | 9/1999 | Rekimoto | 345/419 |
| 6,018,347 A | 1/2000 | Willis | 345/419 |
| 6,026,371 A | 2/2000 | Beck et al. | 705/14 |
| 6,057,856 A * | 5/2000 | Miyashita et al. | 345/633 |
| 6,091,417 A | 7/2000 | Lefkowitz | 345/357 |
| 6,219,045 B1 | 4/2001 | Leahy et al. | 345/331 |
| 6,237,030 B1 | 5/2001 | Adams et al. | 709/218 |
| 6,243,093 B1 | 6/2001 | Czerwinski et al. | 345/355 |
| 6,311,195 B1 * | 10/2001 | Hachiya et al. | 707/512 |
| 6,329,994 B1 * | 12/2001 | Gever et al. | 345/473 |
| 6,331,858 B2 | 12/2001 | Fisher | 345/582 |
| 6,414,677 B1 * | 7/2002 | Robertson et al. | 345/419 |
| 6,437,777 B1 * | 8/2002 | Kamachi et al. | 345/419 |

OTHER PUBLICATIONS

S. Benford, "A Spatial Model of Interaction in Large Virtual Environments,", *Presented at Third European Conference on Computer–Supported Cooperative Work (ECSCW '93)*, Proceedings Kluwer Academic Publishers, pp. 107–132, Sep. 1993. Attached is copy of the paper submitted to the Conference, pp. 1–15.

J. Barrus et al., "Locales and Beacons: Efficient and Precise Support for Large Multi–User Virtual Environments" *Technical Report TR95–16A, IEEE Computer Graphics and Applications*, vol. 16, No. 6, pp. 50–57, Nov. 1996. Attached is a copy of the report from an unknown source, pp. 1–16.

H. Abrams, "Three–Tiered Interest Management for Large Scale Virtual Environments," *Proceedings of the VRST 98*, [Internet] http://npsnet.nps.navy.mil/zyda/pubs/vrst98.pdf, Nov. 1998.

"Genius–PC Receives Awards in Italy", [Internet] http://www.geniusnet.com.tw/genius/news/venusitaly.htm. Printed Aug. 25, 2000.

"NetScroll Optical: The High–Precision Scroll Optical Mouse," [Internet] http://geniusnet.com.tw/genius/pro/mouse/netscrolloptical.htm, Printed Aug. 25, 2000.

"Green Finger Pointer: FingerMouse III," [Internet] http://www.greenworld.net/html/fpointer.htm, Printed Aug. 25, 2000.

"Hyper 3–D Pinball", [Internet] http://www.pcgameworld.com/reviews/h/hyper3dpinball/index.htm, Printed Aug. 25, 2000.

"OBD–2 Automotive Scan Tool Browse 3–D scrolling real time chart screen shot", [Internet] http://www.obd–2/dat3dg.htm, Printed Aug. 25, 2000.

"Worlds.com Awarded U.S. Patent for Scalable 3D Client Server", [Internet] http://www.gamasutra.com/php–bin/product_news_display.php?story=348, pp. 1–2, Apr. 25, 2001.

A. Patrizio, "3–D Patent a World of Trouble?", [Internet] http://www.wired.com/news/print/0.1294,43490,00.html, p. 1.,May 3, 2001.

* cited by examiner

Traditional Plugin Architecture

The Muse Software Components with Communication Lines

The Muse Browser Architecture

The Visualization Component Architecture

XML Loading Process Example

XML Handler Process

Message Protocol Mechanism

Muse Communicator Architecture

Muse Interactivity Browser Connections

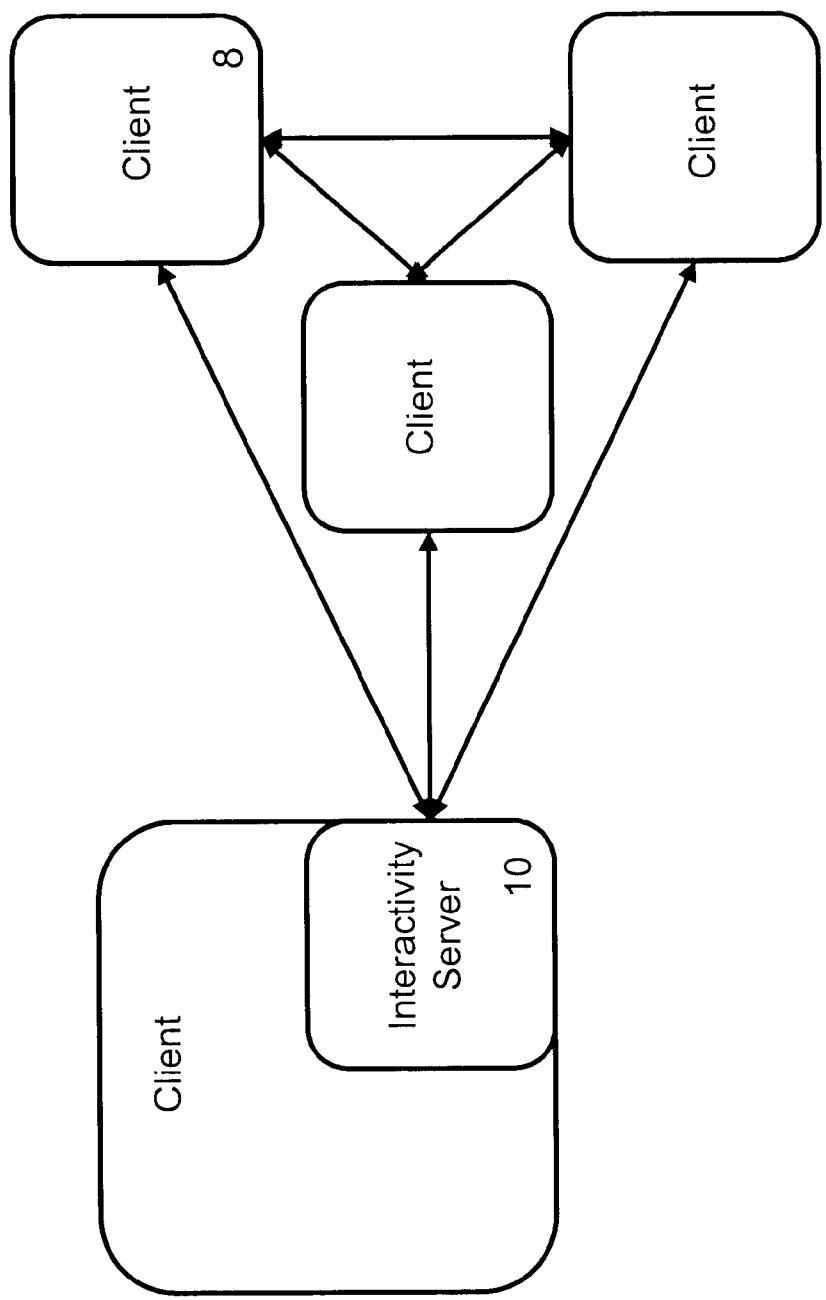

Muse Community Server Connections

NETWORK-BASED THREE-DIMENSIONAL MULTIPLE-USER SHARED ENVIRONMENT APPARATUS AND METHOD

This Application claims the benefit of provisional application Ser. No. 60/096,884 field Aug. 17, 1998.

BACKGROUND OF THE INVENTION

1. Field of the Invention

The invention relates to a computer program and system for providing a three-dimensional browser for a shared network environment, and particularly to a network-based platform which incorporates integrated markup language and rich media for multi-user interactivity, browsing and e-commerce.

2. Disclosure of the related Art

The Internet has provided the means for accelerating the exchange of information as we progress through the information age. End users may interact through their desktops, laptops and set-tops with anyone similarly having a processor with internet capability. Businesses may advertise and sell their products and services by configuring web pages that a user/consumer may visit either freely or via password access. Also, applications may be downloaded and run from another computer located anywhere in the world, or they may be loaded on a user's hard drive from an audio or video CD or DVD or CD- or DVD-Rom.

Today's internet browsers or clients for personal computers can only locate and retrieve files from servers having limited types and forms of content and features. Conventional browsers limit users to a basic environment that is only nominally configurable via a small group of "preferences." A user visually moves a cursor around a graphic display typically by mouse or keypad inputs. The user can hyperlink to other internet locations or web pages by executing specially highlighted texts or two-dimensional metaphors for desired internet locations. The user is typically alone in the browser environment, but may chat with another user by expression-limited text boxes, or through an audio link that functions much like a telephone handset connection.

There are applications that provide realistic rendering spaces for experiencing audio and/or visual content. These applications are typically not configurable and don't provide means for surfing the internet. Some examples include games applications and audio/video CDs and DVDs that incorporate sophisticated graphics. The games applications allow multiple users to interact, but only under the restrictions of the games programs. These applications programs do not provide a way to leverage rich media or to display HTML objects. The audio/video DVDs typically provide a solitary experience where a user executes an object and views and listens to audio and video files without interaction with other users.

Most high quality software packages provide a means for developers to extend the software to suit their own needs. Traditionally, this is achieved through 'Plugins'. Plugins allow 3rd party developers to dynamically add features after the product is released. Historically, this has proven itself as a very powerful means of extending and modifying software packages.

Referring to FIG. 1, traditional applications provide limited extensibility through a plugin architecture. Plugins 2 are dynamically loaded at run time, and have access to the application through a well defined API 4. This API is well defined for the release of the application 6 and cannot be changed without releasing a new version of the application 6. This 'well definedness' is the cornerstone of API design. Generally, the API 4 is not modifiable. This allows 3rd party developers time to learn, build upon, and release extensions to the application 6 before the API 4 changes again in the next "dot oh" release. Well definedness has the unfortunate side effect of slowing the evolution of the API 4—new features are carefully added, if at all, or (in most cases) will wait until the next major revision of the software. This gives the API 4 a "lurching" evolutional path—"lurching" forward with a large set of features, then remaining static during the entire release cycle.

Additionally, the traditional plugin architecture shown in FIG. 1 provides for little or no communication between the plugins 2. Forcing each plugin 2 to work with a static set of resources limits their functionality and relegates them to simple extensions rather than allowing them to make a broad contribution to the user experience. Some examples of the application 6 employing traditional plugin architectures include Netscape Communicator, Adobe Photoshop, and 3D Studio Max.

SUMMARY OF THE INVENTION

A client computer program provides instructions for a processor to locate and retrieve rich media and HTML files over a network, such as the internet, an internet or an LAN, for running in a three-dimensional (3D) graphical user interface. The program provides instructions for the processor to generate a 3D graphical user interface on a display. Then, the processor generates a metaphorical user object for navigating and interacting in the three dimensions within the environment via navigational and interactional inputs, respectively, from a user. The processor also integrates an HTML object into the environment, and interacts the user object with the HTML object in response to an interactional input from the user.

Preferably, the processor generates one or more additional user objects for additional users. Each of the additional user objects can also interact with the HTML object, the first user object and/or each other within the environment in response to interactional inputs from the additional users. In addition, the first user object may interact with any or all of the additional user objects in response to interactional inputs from the first,user. The interactional inputs may be proxy expressions from one user to another.

A rich media object may be provided in addition to the user and HTML objects. The rich media object may be interacted with by the user objects as well. The rich media object may be a viewing screen wherein images are displayed that the users may view together within the environment. The rich media object may also be an object for sale by a merchant, and the program may accept bids and execute contracts of sale from the users. Each user may reconfigure the rich media object by interacting with it. Each user may add a new rich media or HTML object to the environment by creating it using authoring tools provided within the program.

Each of the user objects may navigate within the environment by "flying" in a continuous path to a destination such as the HTML object, the rich media object or another user object. Alternatively, each user object may "warp", or move directly from a present location to a chosen destination.

The program may also provide hyperlinks to component applications or internet destinations, such as may be provided by still other users. The program may provide any other function that is conventionally provided by world wide web browsers.

A bot object may be provided which interacts with any of the user objects, and preferably interacts in response to commands issued from another processor or set of programmed instructions. The bot object may function to provide instructions to the user objects or information about the program. The bot object may lead a discussion or other forum as programmed by another user such as an instructor, a merchant, or an auctioneer.

Each user may set the point of view of his/her corresponding user object within the environment. Each point of view may be the same or different than the points of view of the other user objects.

The program may be disseminated to other users by users who already have the program on their computer. The user already having the program may disseminate the program by attaching it to an email as an executable file and sending it to another user. The program may be automatically downloaded to a memory space of the new user when the new user executes the executable file. Preferably, the executable attachment is less than 100 kilobytes in size.

The program comprises a component architecture which may be readily expanded by seemless automatic downloads of new versions of component applications, by reconfigurations performed by the user, or by automatic or user initiated downloads of new component programs that may be created by other users. The component architecture allows for content creation and modification, and for communication between components.

BRIEF DESCRIPTION OF THE DRAWINGS

FIG. 11b illustrates interactivity server-browser and browser-browser interconnections in accord with the present invention.

PATENT DETAILED DESCRIPTION OF THE PREFERRED EMBODIMENT

A software platform in accord with a preferred embodiment of the present invention is made up of a number of software executables, software plugins, software scripts, communication protocols and file formats. These elements work in together to form a 3D, collaborative, shared-environment for immersively browsing compelling local and remote content and communicating with other members of the Muse Community.

Figure 2:
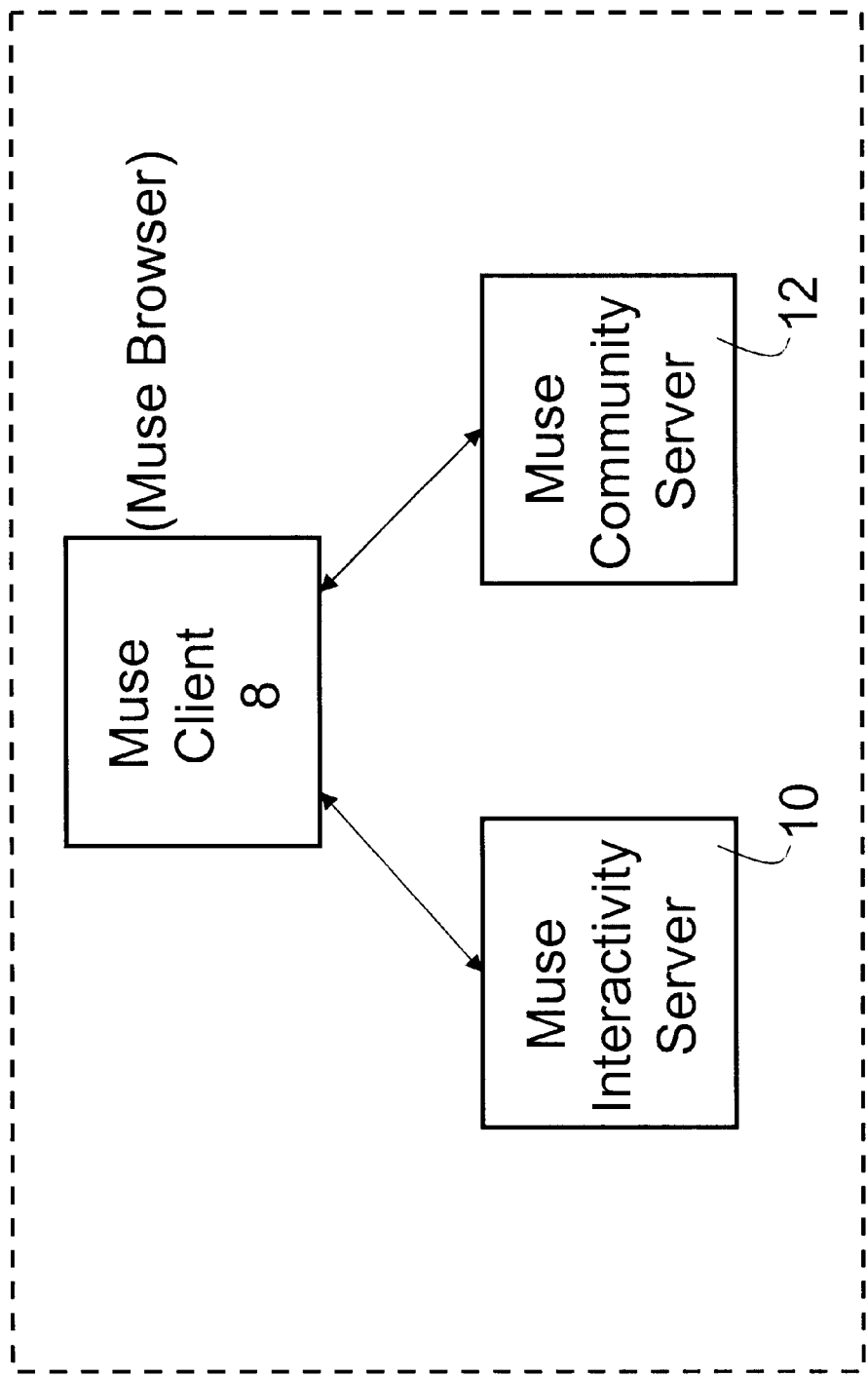
FIG. 2 shows an arrangement of main software components in accord with the present invention.

Referring to FIG. 2, the major software components of the Muse Environment are:

1—A real-time, 3D, multi-user application known as the Muse Client or Muse browser 8;

2—Server application that manages the interactive state of a Muse site, known as the Muse Interactivity Server 10;

3—A server application that manages the identity and community aspects of the Muse environment, know as the Muse Community Server 12; and 4—An evolving, growing set of extensions to the Muse Client know as Muse Applications.

The Muse Browser

Figure 3:
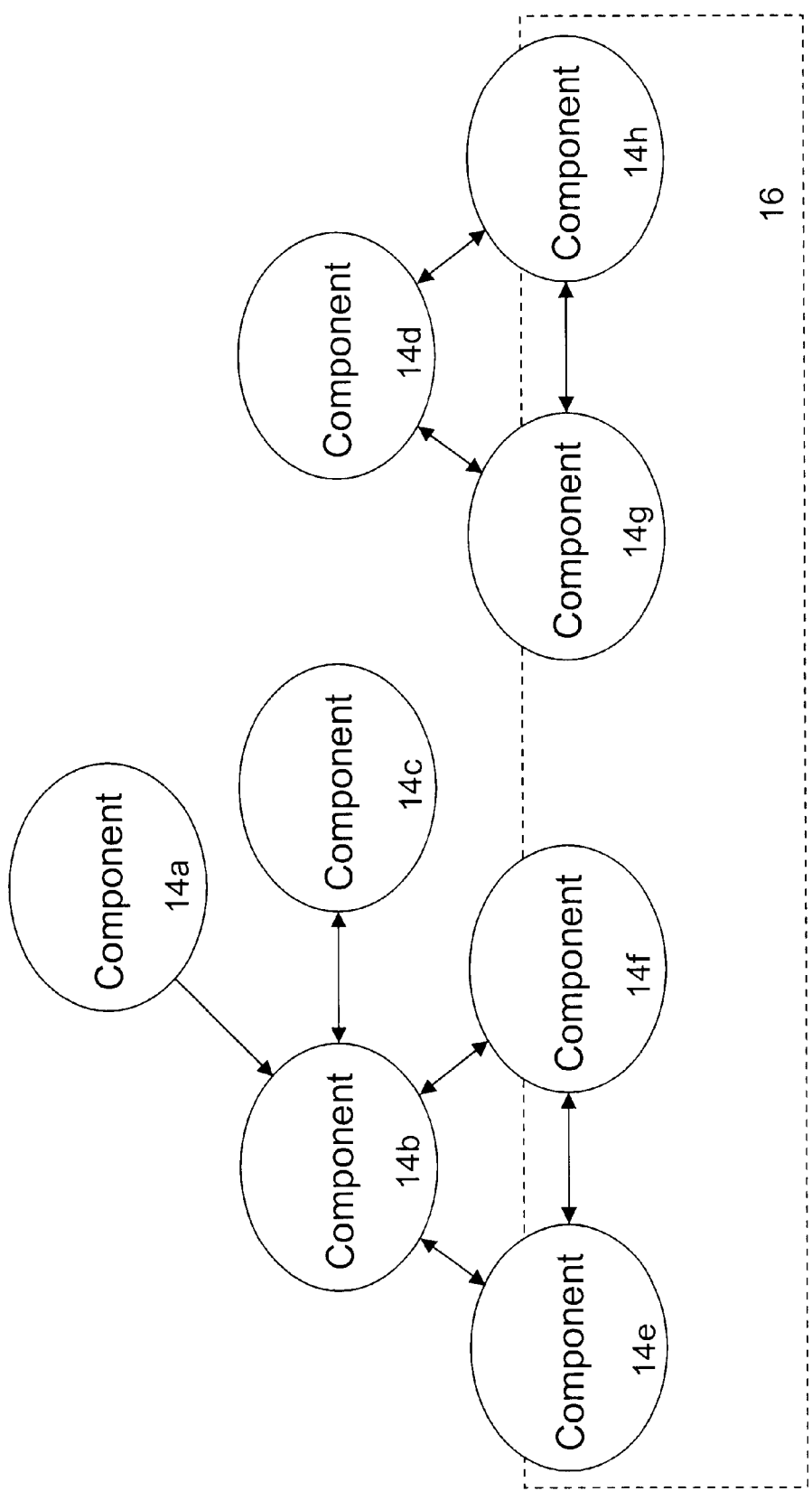
FIG. 3 shows a component architecture in accord with the present invention.

The Muse Browser 8 allows users to view and interact with 3D content and other users through a number of mechanisms. FIG. 3 illustrates a component architecture in accord with the preferred software embodiment, wherein these mechanisms manifest as a number of dynamically updateable software components 14a–14h that together create the Browser's functionality.

The Muse Client will be available through a number of distribution channels. Primarily, the Muse Client will be downloaded from web servers operated by Muse and partners of Muse. The initial download is actually a very small application, less than 100 KB. The downloaded application is invoked by the user which then proceeds as a "download wizard" for the rest of the Muse Client download. This wizard will download the actual Muse Client and initial content and start the Muse Client when the full download is completed. At this point, the user will be stepped through the registration process and will be immersed in their personal workspace to start their Muse Experience.

Dynamic loading of components is at the heart of a few important capabilites of the Muse Client. First, the fundamental capability to load components allows Muse and third parties to extend the Muse Client with high performance, platform native code. Second, this capability can be used to allow minor and incremental updates to the Muse Client without requiring a full download of the Muse Client. In fact, many components can be dynamically updated without even restarting the Muse Client. This allows for a very seamless evolution in functionality of the Muse Client without being annoying to users.

Figure 1:
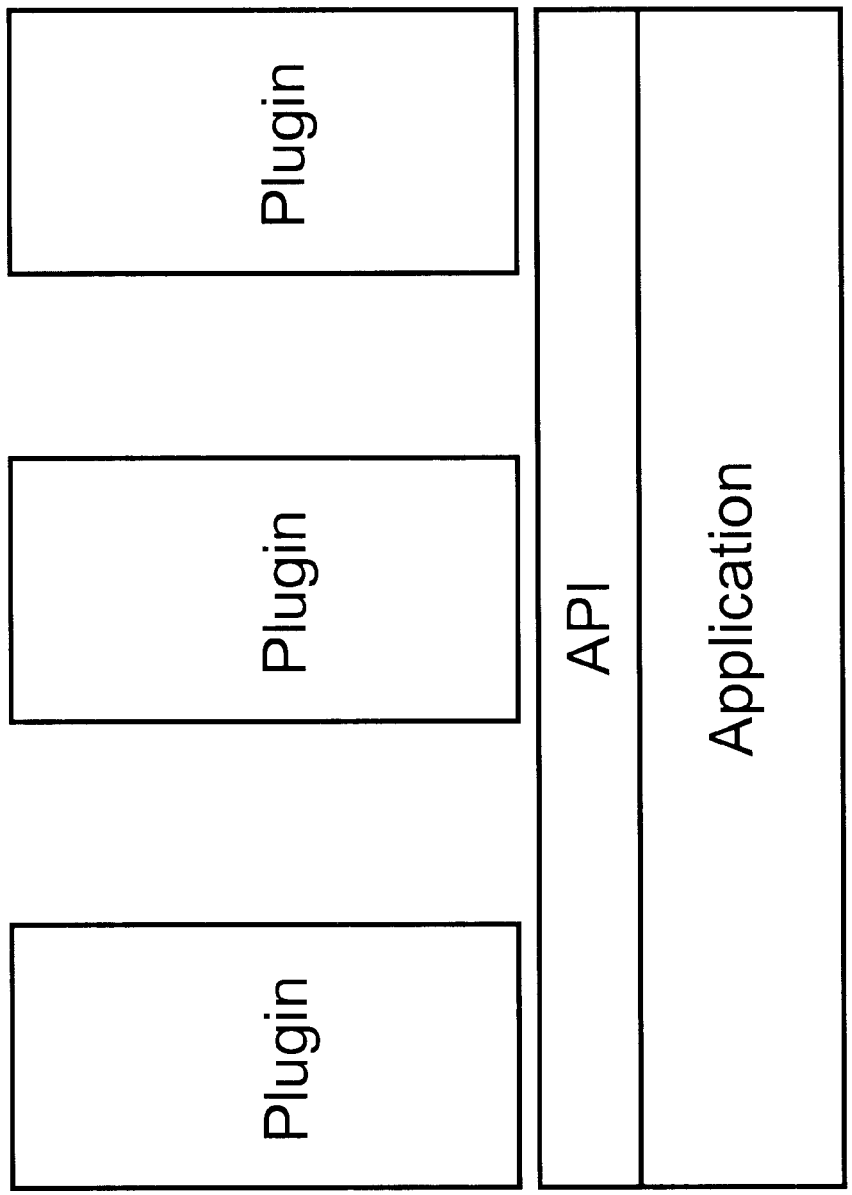
FIG. 1 shows a conventional plug-in architecture.

Referring to FIG. 3, a Muse application 16 is made extensible via a component architecture instead of a traditional plugin architecture such as is illustrated at FIG. 1. The Muse environment builds on the success of plugin architectures and is designed to alleviate the major shortcomings of plugin architectures. First, Muse components 14a–14h may interact with their peers in any way. For example, component 14b is shown interacting with each of components 14a, 14c, 14e and 14f, and may communicate with many other components.

A component 14a–14h may load any number of other components that it needs. Furthermore, it can make calls directly into these other components without intervention from the main application. This has several advantages—it provides for scalable communications between components, as the application is not brokering and translating all communications between components. From the business side of things, it can provide for scalable development models, as components can be revised and released asynchronously from Muse applications.

Changes in APIs do not necessarily invalidate old plugins. Legacy and deprecated object APIs continue to be released during a transition period while new interfaces are brought in along side them. The Muse component system makes sure the correct interface type is found. While the Muse component system illustrated at FIG. 3 is unique among plugin architectures, it builds upon the solid foundation that has been available in operating systems for many years. The same dynamic linking mechanism that enables COM, CORBA, and every plugin environment is employed by the Muse component system.

The Muse component environment is open, enabling, and extensible.

Open

According to the preferred embodiment, open access is provided to every part of the Muse environment. The base Muse environment consists of a rich set of components (see 14a–14h of FIG. 3). Each component provides APIs to allow access to their full functionality. A nonexclusive list of preferred core components that are provided that are provided with the Muse browser includes the following:

3D Visualization API—The 3D API provides access to the Scene Graph and the current state of the simulated Muse environment. 3D GUI API—The 3D GUI API enables creation of a rich 3D GUI simply by creating Buttons, Sliders, and Window objects. Users of the 3D GUI API need not be concerned about the underlying 3D drawing and management. The 3D GUI API allows users to focus on what the widgets do, rather than how to make them 3D.

Network API—Provides for access to existing protocol servers such as HTTP and FTP, as well as real-time streaming data. Components are able to define their own streaming data and set up communications channels to other machines running the Muse client.

Data Handling API—Provides hooks into an XML data handler: XML is used to specify, among other things, Muse Worlds. Anyone may add their own tags to the Muse XML format using the Data Handling API.

Enabling

The Muse Component Architecture enables developers to create rich 3D multiuser experiences in a very short amount of time. Each component is easy to use. New developers can rapidly create a new 3d multiuser application in Muse. For example, creating a simple 3D button that teleports the user to a server can be as simple as:

widgets::button myButton;
actions::gotoUrl      gotoHomeserver
  ("muse.musecorp.com");
myButton.addActionObserver(gotoHomeserver);

Developers adding new functionality to the Muse environment need not rewrite complex 3D, GUI, networking, or data handling components. These components are already provided—each designed to be leveraged and specialized. Developers are free to focus on their area of expertise rather than conquering the many details of constructing 3D multiuser environments.

Muse components also enable a great deal of specialization. Real requirements quite often go beyond the basic "create a simple button". In some cases, high-level features such as buttons may not be directly suited to a particular developers' needs. With a little greater understanding, most every aspect of the button can be modified—its visuals, animations, and actions.

Extensible

The Muse component system encourages developers to extend the system with new components. Once added, the new components are available to any other component. The new component may adhere to an existing interface or may define its own interface. There are preferably a minimal set of requirements that a new component should fulfill in order to extend the system. Beyond this minimal framework, any type of feature may be integrated into the system as a first-class component.

An exemplary set of minimal requirements includes the following:

Components are dynamically loadable and unloadable. The code resides in a DLL or DSO and is able to free any outstanding allocations on request.

Components provide a simple way to enumerate the contents of a binary package. (Facilities are provided that do this.)

If an interface is defined, the C++ class interface is established and published so that others can use it.

Since the Muse programming environment is open, anyone can add new capabilities. By publishing the interface to new features, any other component that is aware of the interface may call the component This extensibility comes from the same facilities that the Muse environment was built with. Thus, new functionality appears as a seamless extension of the base system.

Figure 4A:
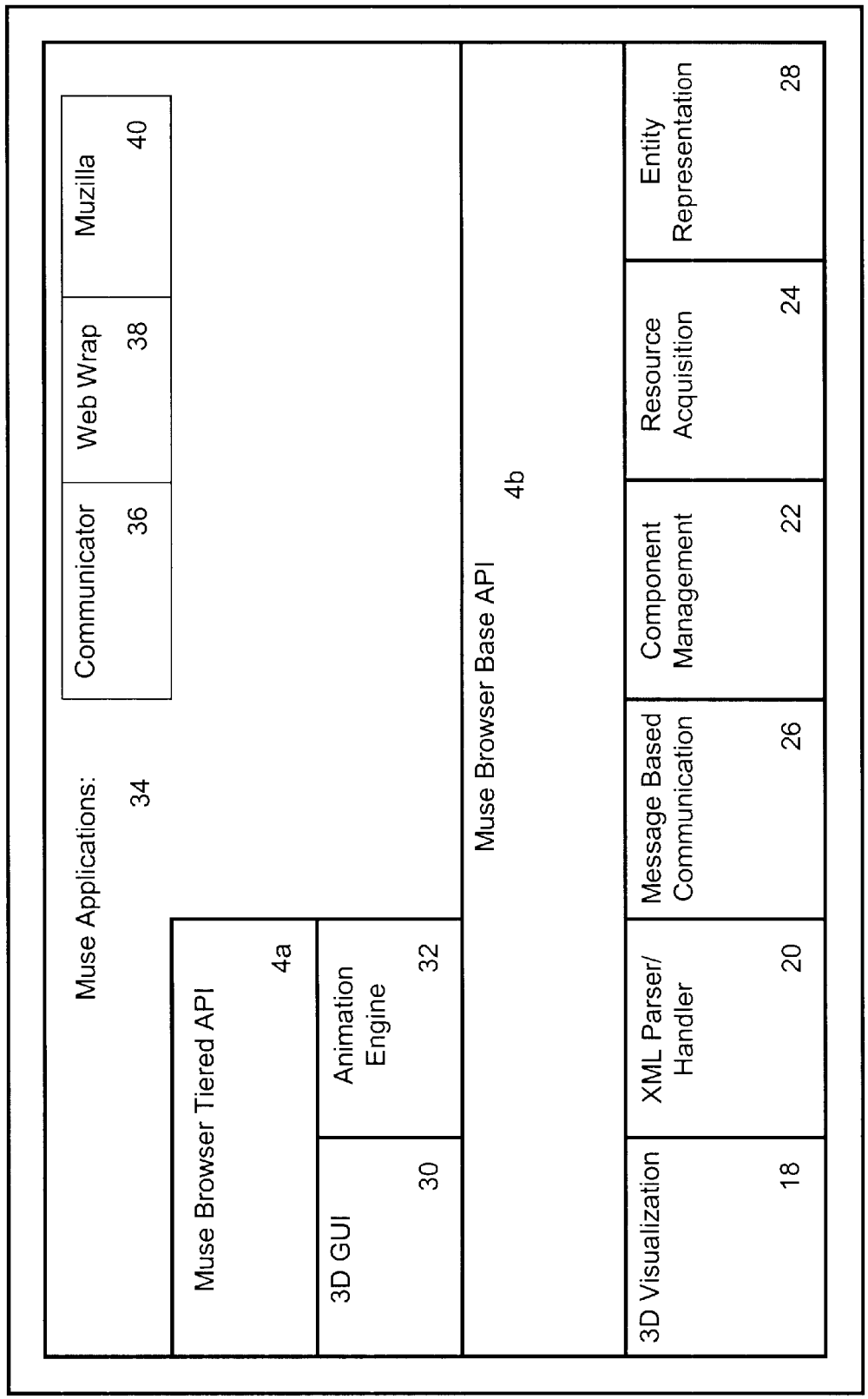
FIG. 4a shows a first architecture of a client in accord with the present invention.
Figure 4B:
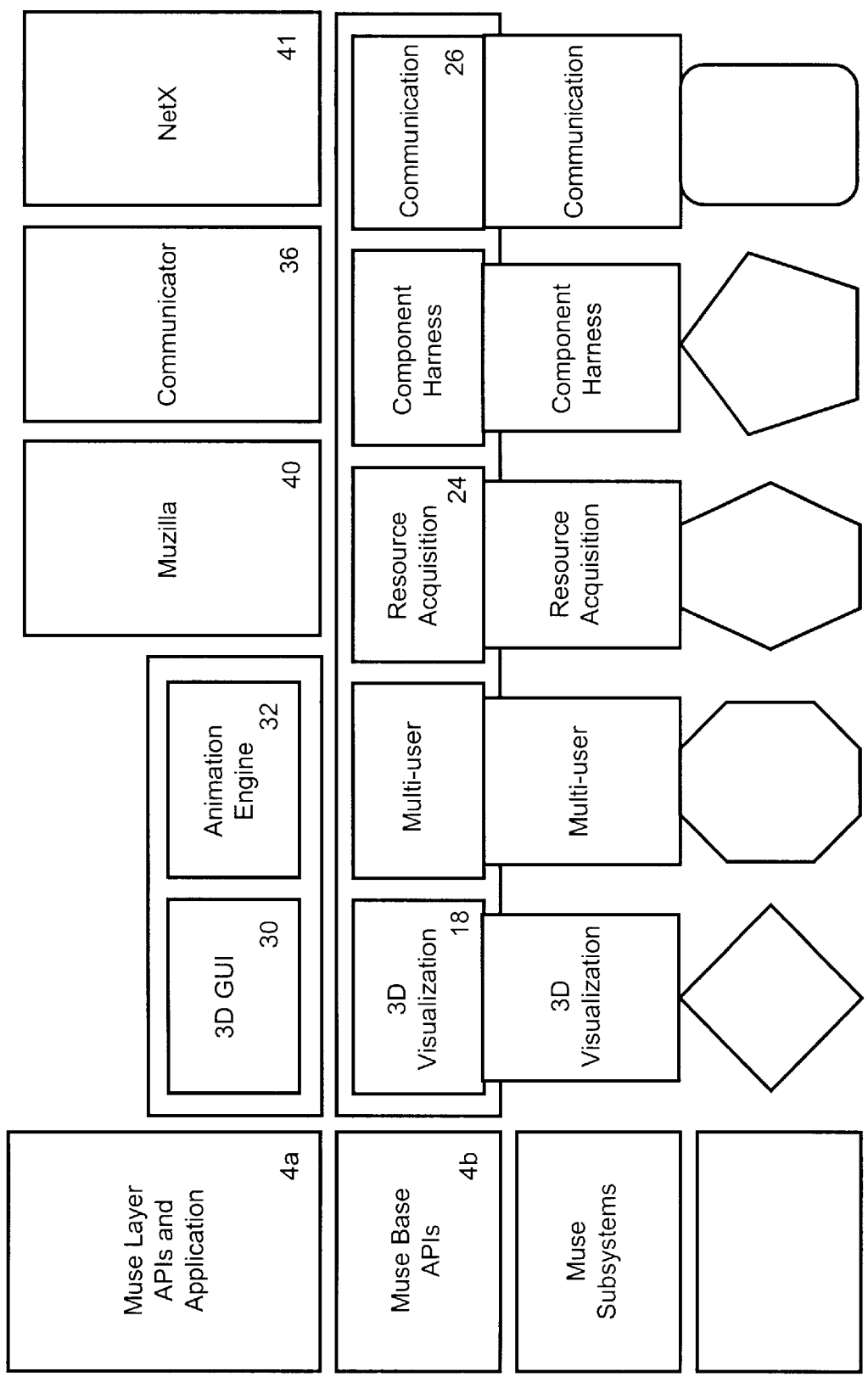
FIG. 4b shows a second architecture of a client in accord with the present invention.

In addition to having certain capabilities, the mechanisms of the Muse browser 8 are exposed for programmatic extension through APIs. In the exemplary embodiments illustrated at FIGS. 4a and 4b, these mechanisms include:

3D visualization component 18 with file format handlers

XML parser/handler 20

Component management 22

Resource acquisition services 24

Message-based communication protocol 26

Entity Representation 28

3D GUI toolkit 30

Animation engine 32

Muse Browser Tiered API 4a and Muse Browser base API 4b

Muse applications 34 including:
  Muse Communicator 36 with email, instant messaging, chat, VoIP, and video conferencing capabilities
  Muse WebWrap 38 for multi-user web browsing
  Muzilla 40, a standards-compliant web browser
  NetX 41, server application 3D Visualization The 3D visualization component 18 of the Muse Browser 8 enables high-performance rendering of complex, dynamic 3D worlds. This component 18 is comprised of a number of layers and sub-components that allow Muse to change the 3D visualization component 18 for strategic or technical reasons without breaking binary compatibility with the rest of the system.

Figure 5:
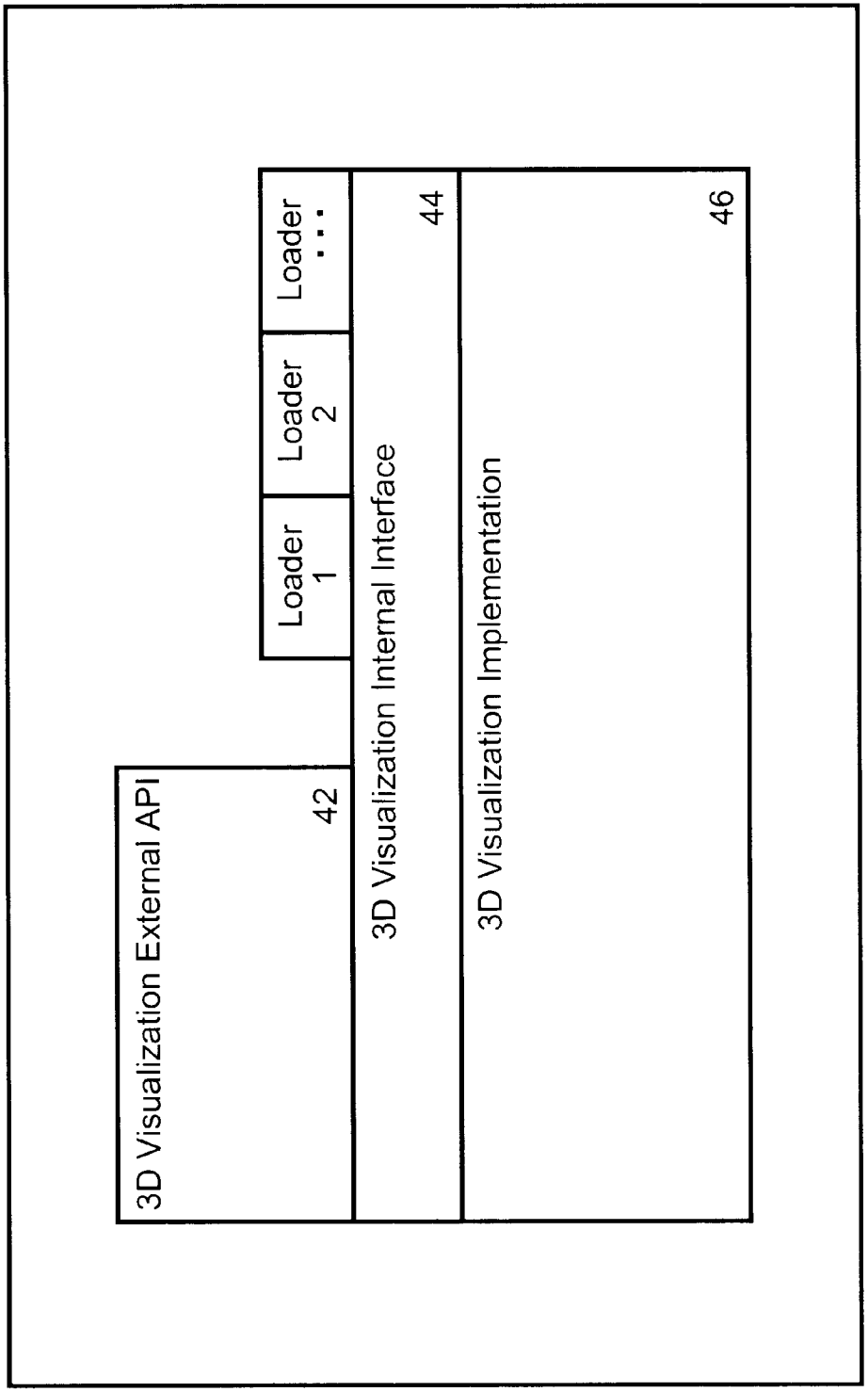
FIG. 5 shows a visualization component architecture in accord with the present invention.

As shown in FIG. 5, the visualization component architecture preferably includes a 3D visualization external API 42, a 3D visualization internal interface 44, and a 3D visualization implementation layer 46. The external API 42 is isolated from the implementation layer 46 by a software layer referred to as the internal interface 44. This allows changes to be made to the lower layers without necessitating changes to the external API 42. This is desirable because it allows all extensions to the system, which are written in terms of the external API 42, to continue to function regardless of changes and revisions made to the lower level layers 44 and 46. This software layering strategy is preferably employed throughout all of Muse's software products and will be discussed in more detail in the section on Component Management.

Visualization of 3D data is a complex task, but Muse has distilled common approaches and created the external visualization API 42. At the heart of the system is the representation of 3D data in a data structure known as a scene graph. The Muse Visualization component 18 preferably has the following capabilities:

Represents geometry as indexed poly meshes with support for multiple (at least 4) textures per mesh Video textures through modular codecs.

Spatialized, 3D sound

A single interface for manipulating any element of the scene graph

This versatile representation of 3D data presents a number of opportunities for implementation of the system. Because the users of the external API 42 are isolated from the specific implementation of the lower layers 44, 46, different implementations can be used on different platforms and different implementations from one revision of the software to another. As an example of the versatility of the system, the system may leverage an existing toolkit, VisKit, for these capabilities. The system may however include another toolkit such as a higher performance rendering toolkit. Also, because VisKit is only generally available on the Microsoft Windows operating system, and so a different implementation will be used in ports to other operating systems.

While rendering is an important part of any visualization toolkit, turning a visualization toolkit into a harness for real application development requires additional functionality. In order for an application to track changes to the state of the 3D data, it needs to be efficiently informed of changes to the 3D data's state.

The typical traditional approach to this is for the application to constantly check the state of interest, and act when that state is changed. This approach does not scale well if a large number of applications are interested in state changes. Most of the computing power of the system will be wasted checking for updates that are not happening.

The approach we employ uses messaging to notify interested applications when state changes occur to the 3D data. This message passing system is based on a widely used object-oriented design pattern know as the observer pattern. In short, applications register themselves as interested in state changes on particular attributes of the 3D data. These applications are then informed every time a state change occurs. The granularity at which state changes are messaged is a key area where Muse has applied its experience in creating its 3D visualization systems 18. Muse groups like topics of state in messages, so messages are not necessarily as fine grained as one state value, but not as coarsely grained as observing 50 state changes. This is referred to as the "appropriately grained observer pattern." This approach strikes a balance between the run-time overhead of having a message represent many states which must be decoded, and the memory overhead of having every state element change be individually observable.

Data for 3D environments is stored in a number of different formats, some more widely used than others. Support for realizing the data represented in a 3D file format comes through file format loaders. Each loader knows how to load one specific type of file format. This loading process includes:

Acquiring the file from it source, whether remote or local.

Reading the file into the computer's memory

Choosing the appropriate loader for the particular format being loaded

Parsing the file to understand its structure and the data within

Converting the file's structure and data into a form understood by the Muse Browser 8

Implicit in the discussion of file loading is the capability to do the opposite operation, which is saving 3D data to a specific format. Saving is done in roughly the reverse of the process described above. There is no requirement that every format that is load-able is also save-able, but that is the preferred case.

Loaders are written by Muse based on documentation of a given format or through information gained through reverse engineering. The process of loading a particular format of data can sometimes lose data if there are constructs present in the format that are not easily represented in the Muse Visualization Component's data structures. In these cases, data that would have ordinarily been lost can be converted into an attribute of the Muse data structures. This attribute can later be accessed and this otherwise useless data can be taken advantage of. This is most important when saving a file. Data that was converted to attributes can be converted back to its format specific representation and saved out with no loss of data.

XML Parser/Handler

The Muse Browser 8 includes an XML parser handler 20 that uses a referential, XML-based format to get information about 3D content, animations, GUI creation and layout. XML parsing is a relatively straightforward operation, which includes parsing and lexically analyzing the input file, and generating an in-memory representation of the data contained in the file. In the Muse XML parser, data is converted to an intermediary in-memory format know as a parse tree, which is traversed to create Muse Browser data structures.

Figure 6:
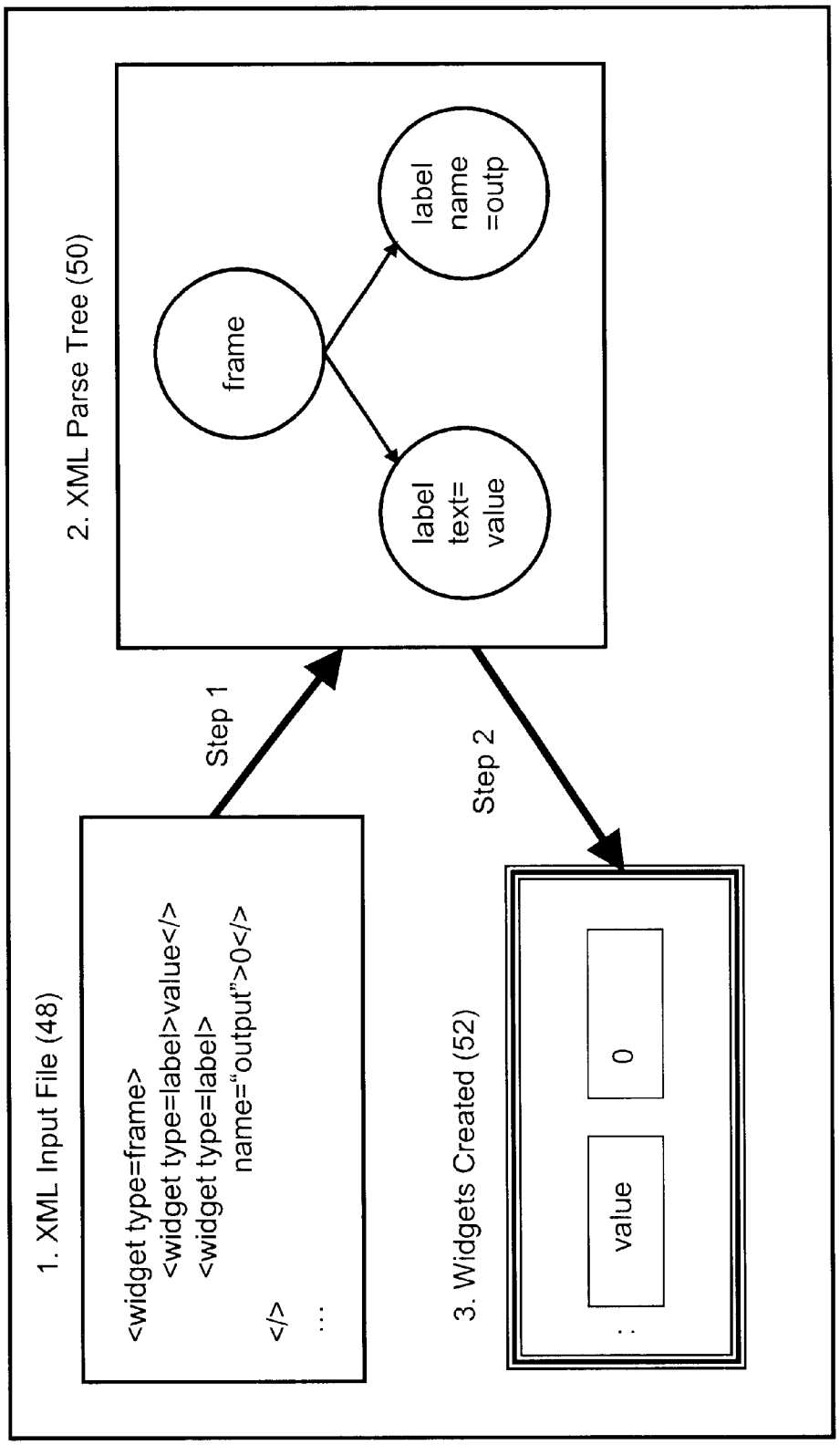
FIG. 6 shows an XML loading process in accord with the present invention.

In order to support extensibility, the Muse XML File Format is not a closed format. Third parties can extend the format to support data that is relevant to their specific tasks. In order for this to be handled in a sensible way, the Muse XML Handler 20 was created. FIG. 6 shows an XML loading process example. In the first step (step 1), an XML input file 48 is parsed to an XML parse tree 50. In the final step shown above (step 2), the XML parse tree 50 is shown to be magically converted to widgets 52. In actuality, the Muse XML Handler was invoked to facilitate step 2 by figuring out how to get the parse tree into usable data (see FIG. 7, discussed below).

The Muse XML Handler 20 allows for arbitrary extension to the way the Muse Client 8 handles different data types referenced in a Muse XML file. The handler 20 stores handler objects that are associated with a particular XML tag name. An example of an XML tag name is "widget", as shown in FIG. 6.

Figure 7:
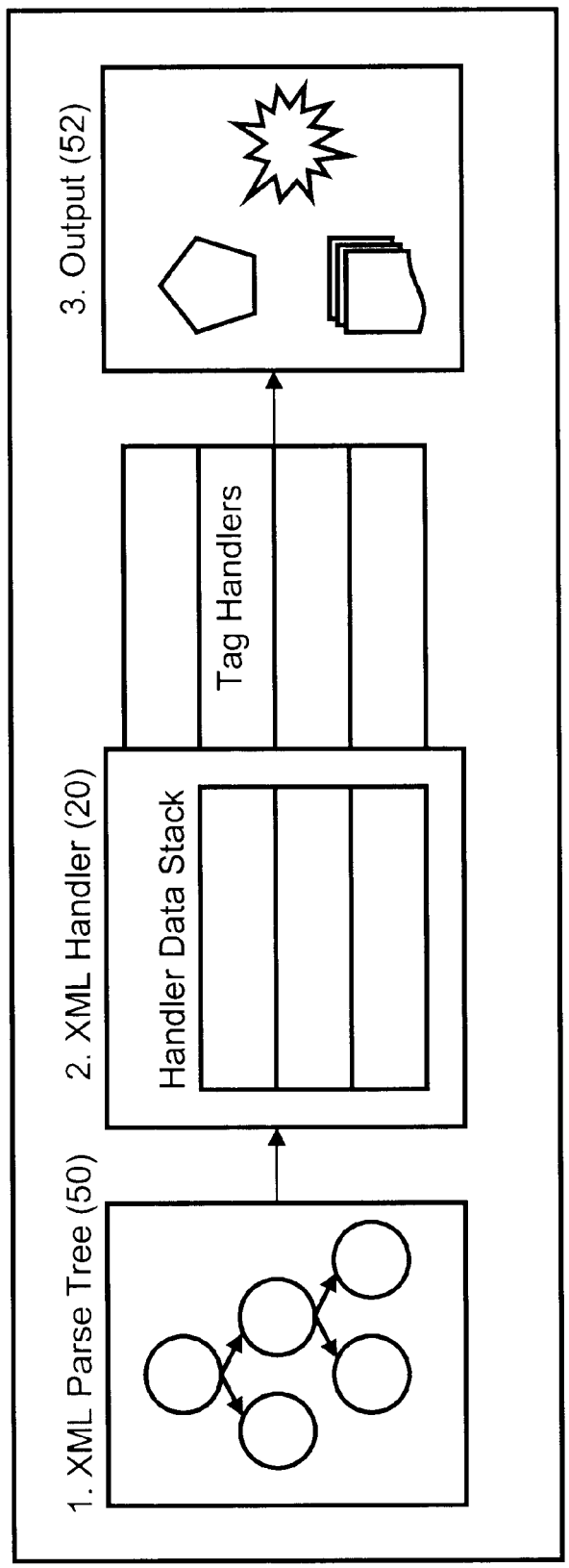
FIG. 7 shows an XML handler process in accord with the present invention.

Referring to FIG. 7, when an element of the XML parse tree 50 is encountered, the handlers are searched in order to find a handler for the given XML tag name. If found, the handler is invoked to handle the data specified by the XML tag. As part of the operation of the handler, it can put the data it created into the handler for other handlers to reference. The data is kept on a stack that reflects the nesting of the XML tags in the XML file and the structure of the parse tree 50. This allows data created by one handler to be associated with data from another handler. This limits the work one handler has to do alone, and creates more robust, reusable handlers. Individual Handlers can be added to a Muse XML hander through the Muse Component Management mechanisms described below.

Component Management

In order for the Muse Browser 8 to function as the preferred embodiment of the Muse Software Plafform of the present invention, it has to support a particular set of modern computing capabilities for component management 22. Among these, is the ability to load and unload executable content, known as Muse Components. In today's computing environment, the job of the operating system in loading, executing and unloading executable binaries is a given. The Muse Browser 8 operates in much the same way with Muse Components. The Muse Component Manager has facilities for loading, executing and unloading Muse Components.

Loading and unloading of components is exploited by the Muse Browser 8 to implement the dynamic updating of Muse Components when new versions are available. The Browser 8 periodically checks with the Muse Community Server 12 to see if any components need to be updated. If so, the Muse Browser 8 will:

Download the new component

Unload the currently running version of that component

Load the newly downloaded component

Third party components can be updated in a similar fashion. All downloads of binary components will go through a security mechanism based on preferences set by the user of the Muse Browser 8. Component updating and downloading can be done automatically as described above, or explicitly the moment the user wishes to check for updates.

The Muse Component Manager enables another feature that is very important to modern computing environments, i.e., inter-component communication (see FIG. 3). In our environment each component can publish its own API. This is generally not enough for one component to communicate with another component, however. The Muse component manager 22 facilitates the querying of available components so that, for instance, a component that is a word processor can find and use the spell-checking component. This enables components with well understood capabilities to be developed independently. This also allows for greater code reuse, improved quality control and more scalable development. Finally, to ensure compatibility between revisions, all Muse Components preferably present an interface through which the component may be accessed. This allows the implementation behind the interface to be changed without breaking components that rely on a particular interface.

Resource Acquisition Services

The Muse Browser is designed to operate in a network-centric environment. This means that resources, such as those describing 3D worlds or executable components, could exist anywhere on the network, including the local machine. In order to make acquiring these resources easier, Muse has developed resource acquisition 24 specifically targeted at making local or remote resource allocation transparent to users and developers. The Muse resource acquisition services 24 will know how to interpret and acquire resources based on URLs. The Service will be invoked when the Muse Browser requests data (because of a loading of a Muse XML file or through an explicit programmatic request). The Service will then find the appropriate protocol handler for the resource and dispatch to that handler to acquire the data.

Figure 8:
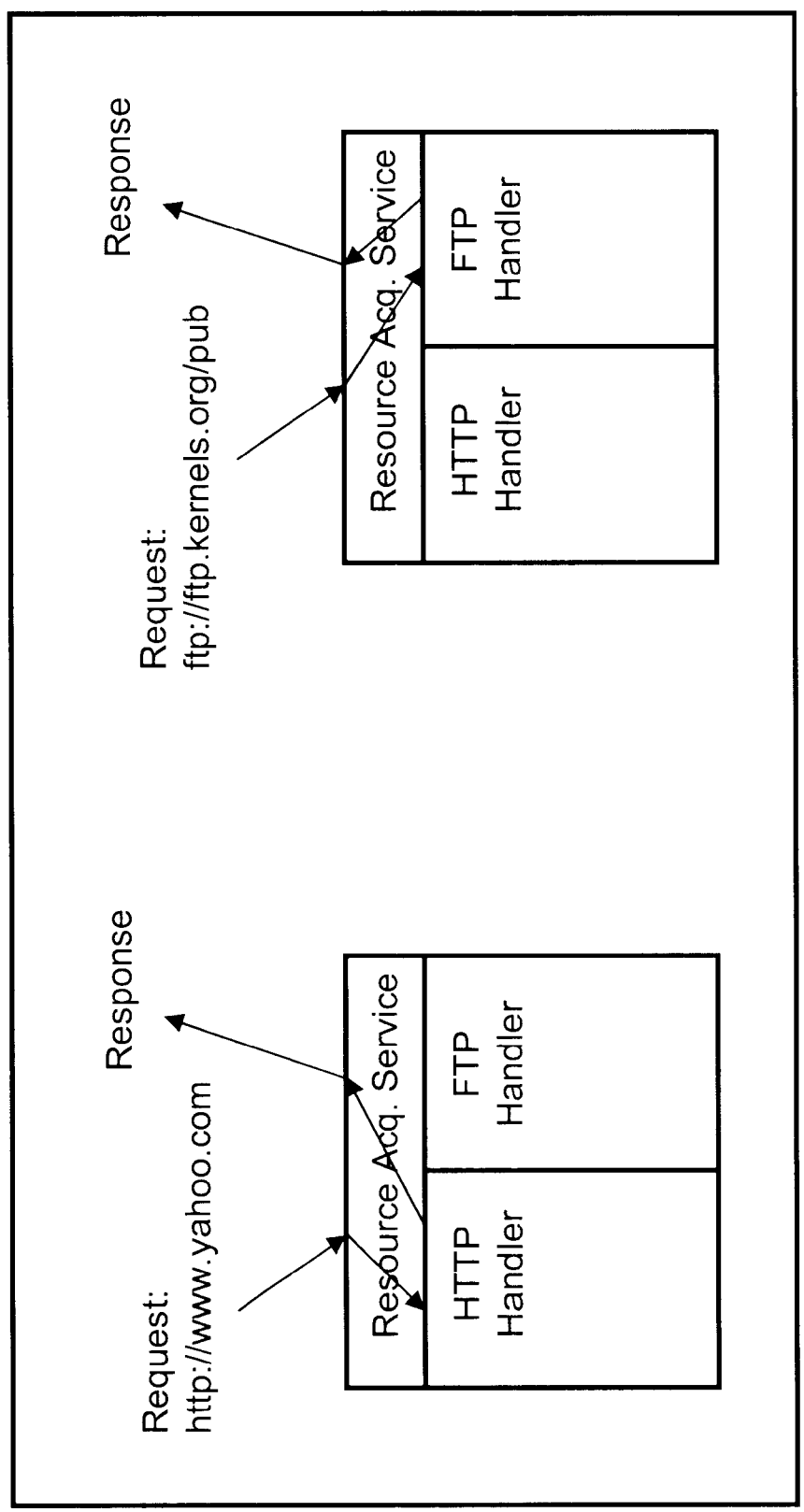
FIG. 8 shows a resource acquisition handling process in accord with the present invention.

FIG. 8 illustrates how the HTTP and FTP protocols are handled by the resource acquisition service 24. More protocol handlers can be added in a modular way through the component system. In addition to acquiring resources on the net, the Muse resource acquisition system 24 is responsible for caching acquired data. Caching allows content that has already been downloaded to be used if the remote version has not been modified since the last download. This greatly reduces download time for often visited sites and often used content.

Message Based Communication Protocol

The communication protocol 26 is a high-level abstraction over traditional internet communication protocols. It presents a powerful development environment for creating efficient distributed applications. Essentially an object oriented, message passing toolkit, the communication API facilitates rapid development of application protocols by insulating developers from the underlying network details.

Figure 9:
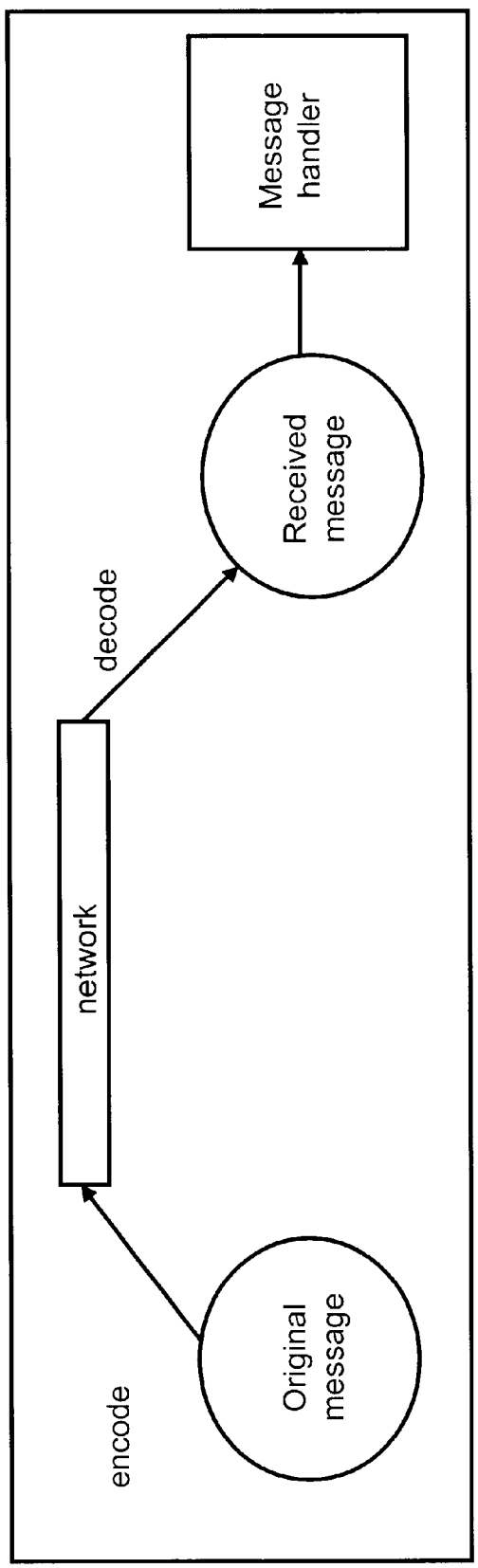
FIG. 9 shows a message protocol mechanism in accord with the present invention.

The Muse Browser is a network-centric application. That means it is designed to deal with remote resources and services as easily as it would deal with those resources on a local machine. To that end, Muse has designed an object-oriented message passing protocol 26, an illustrative mechanism of which is shown at FIG. 9, to enable simple communication of data between a Muse Browser 8 and a Muse Interactivity Server 10, a Muse Community Server 12 and other Muse Browsers 8. The message based communication protocol 26 is a middle-ware layer that abstracts many of the details of sending bytes of data over TCP/IP networks to remote machines. The protocol allows a message object on one machine to be recreated on another machine in order to be handled. The underlying mechanism involves:

Encoding the data to a network-friendly representation

Sending the data across the network to one or many other machines

Decoding the network-friendly representation of the data

Recreating the original message object for processing by the appropriate handler In addition to simplifying the nature of transmitting data, the Muse Communication Protocol 26 also allows for the simple specification of destinations and Quality of Service (QOS). When communication channels are opened up, a destination for the message flow must be set. At the lowest level, another machine's IP address could be used to specify the destination. At a higher level, there are a number of enumerated destinations, including "Server" to send messages to the Muse Interactivity Server 10 on which the Browser 8 is currently browsing, and "Neighbors" which allows sending messages to all other Browsers 8 within a server defined neighborhood. Using "Neighbors" allows messages to be sent only to a subset of the Browsers 8 using an Interactivity Server 10. This allows the Interactivity Server 10 decides how many Browsers 8 can efficiently communicate without degrading performance. In addition to this mechanism, there are a number of settings that will allow a communication channel to have a particular QOS. Upon creation, a communication channel can be asked to process incoming and outgoing messages at a certain rate, with a promise of how reliable that communication will be and how high in the priority chain the channel is for processing affinity.

Entity Representation

This element of the Muse Browser 8 embodies the representation of individual users in the shared environment via an entity representation component 28. This is far more than just the visual representation, and includes behavioral representations. This also includes non-visual properties and attributes about the user that might be relevant in a given environment. These properties can include height, weight, moment of inertia, current motion model and other things that aid in the simulation aspects of the environment. The Muse Entity Representation 28 also includes data that is important for the operation of the Muse Community Servers 12 and Muse Interactivity Servers 10. This Muse entity representation 28 also includes the user's unique Muse ID, position in the 3D environment and other information that allows the user to be identified and authenticated. This information is not available through the Entity Representation API, and is only used to ensure that an entity is authenticated and not the victim of identity spoofing or hijacking.

The Entity Representation 28 is designed to allow other entities to be managed by a single Muse Browser 8. These entities would represent agents acting on behalf of the actual user, and can be easily discerned from actual users through both programmatic and interactive means. Agents can also be mandated to have a certain visual queue, which makes them very easy to distinguish in the Muse environment.

Agents can be used for a number of tasks. Agents can simply act as pets or can even act as watchdogs protecting personal goods or scaring away strangers from children. Smarter, more resourceful agents can be instructed to find friends with common interests or data with specific attributes.

3D GUI Toolkit

The Muse 3D GUI Toolkit of the 3D GUI 30 of Muse is one of the cornerstones in the Muse Browser's capability to create usable applications in a 3D environment. It is on par with 2D GUI toolkits as far as robustness and feature sets are concerned. It goes beyond 2D GUI toolkits by leveraging the natural queues available in a 3D environment and by allowing a wholesale replacement of not only the GUI toolkit's appearance, but it's behavior as well. This is done through a mechanism referred to as Muse Widget Representations. These representations are used to represent different states of a widget.

Some common widget states are "normal", "disabled", "focused" and "pressed". When a widget's state transitions, the representation for the old state is told to hide itself, while the new representation is told to show itself. In the most literal sense, these messages do what they sound like they do, the show or hide a representation. But, the mechanism is general enough, that widgets could start and stop animations or other procedural behaviors when they are told to show or hide. These representations can be added or removed from a widget at any time, so the entire look, feel and behavior can be changed dynamically.

The toolkit includes a number of basic widgets, including frames, labels, buttons, multi-style text, sliders, scrollbars and a few widgets that take advantage of the $3^{rd}$ dimension including a trackball and a cube slider. Also, there will be a number of more complex composite widgets including dialog boxes, multi column list-views, tree views and spelling widgets. Additionally, certain Muse Applications will also be embeddable as widgets, including Muzilla.

The widgets that deal with file browsing have a unique aspect to them. They are able to deal with data in a relational way, in addition to the traditional directory hierarchy organization present in modern operating systems. This relational system allows files, both remote and local, to be associated with arbitrary topics that users are interested in. This allows a user to find an image by doing a search for a keyword that was associated with the image, rather than slaving through directory after directory of images to find the right one. Files transferred throughout the Muse Platform will retain their associations so that all users can benefit from the categorization of files.

Any GUI toolkit, 2D or 3D, needs management of a few centralized services. This is normally done with a technology well known as a "window manager." The Muse 3D GUI Toolkit includes a window manager to manage the following items:

The Cut/Paste Clipboards

The Current Text/Object Selection

Drag and Drop Messages

Currently Running Tasks/Applications

Display Authentication window Focus

Input Focus

The Muse Window Manager manages these aspects in a corifigurable way. Some of the aspects can be changed through preferences, but some of the behavior of the Muse Window Manager is fixed to ensure our most important usability and user interface approaches can be guaranteed from one Muse Browser 8 to another.

The Muse Browser 8 allows immersive browsing of 3D worlds, but interacting in 3D worlds with 2D input devices like mice requires some heuristics and adaptation. Because this is such a common problem in these kinds of environments, it is recognized in the present invention that the input model is a replaceable, modular component of the Muse Window Manager. The Muse Input Model interface allows for different metaphors to be used when mapping 2D input and gestures to 3D interaction. This can be leveraged in a number of ways. Different input models can be developed for expert versus novice users. Also, different input models can be used based on context. For instance, a different input model could be used whether the user is simply viewing an environment versus whether the user is modifying or creating a 3D environment. It is important to note that an input model is not the same as a motion model. Motion models describe how an entity traverses an environment. The Muse Input Model describes how an entity affects a 3D environment. In its most distilled form, the Muse Input Model is designed to distill input device actions to events in the Muse Browser. These events include grabbing and releasing objects, rotating, translating and scaling objects and interpretation of key bindings.

Animation Engine

Up to this point, only the functionality to visualize relatively static scenes has been described. But, the Muse Browser 8 is capable of manipulating the environment in high performance ways. It is important that we exploit this in a powerful way. The Muse Animation Engine 32 uses the underlying capability of the Muse Browser 8 to animate objects in a number of ways. One of the most important types of animation that is enabled is key frame animation. Both rigid body and soft body forms of animation will be supported. This powerful specification for animation objects is funneled up from the file loading process as attributes to the animation engine. Specifically, an object that had associated animations would have one or more animation attributes associated with it. Then, when invoked, the Muse Animation Engine 32 would audition that object's animations. This could occur as a normal aspect of a highly dynamic environment, or based on an event from a user's interaction with a part of the 3D environment. The Animation Engine 32 supports modular extensions to the supported animation types. A new type of animation style may be easily integrated by Muse or a third party through the Muse Component Management System 22. Inverse kinematics and procedural animations are other forms of animation that will be supported by the Muse Browser 8.

Muse Applications

The goal of the architecture and capabilities of the Muse Browser 8 is to enable rapid development of network enabled applications in a 3D environment. As a testament to accomplishing that goal, Muse provides a number of applications exploiting the Muse Browser's capabilities. These applications are Muse Components, built with the toolkit of the Muse 3D GUI 30, using the Muse Communications Protocol 26 and a number of the other capabilites of the Muse APIs as necessary. Most of the applications also present their own specific APIs in order for other Muse applications to leverage their functionality.

Muse Communicator

The communicator 36 provides a front-end for the various methods of communicating on the net. Chat, instant messaging, email, VoIP, video conferencing and other emerging communications methods are integrated under this umbrella. An advnatage of this integration is ease-of-use for end users. Regardless of the nature of the communication, contacting and interacting with other users is simplified and tailored to the individual user's desires.

Figure 10:
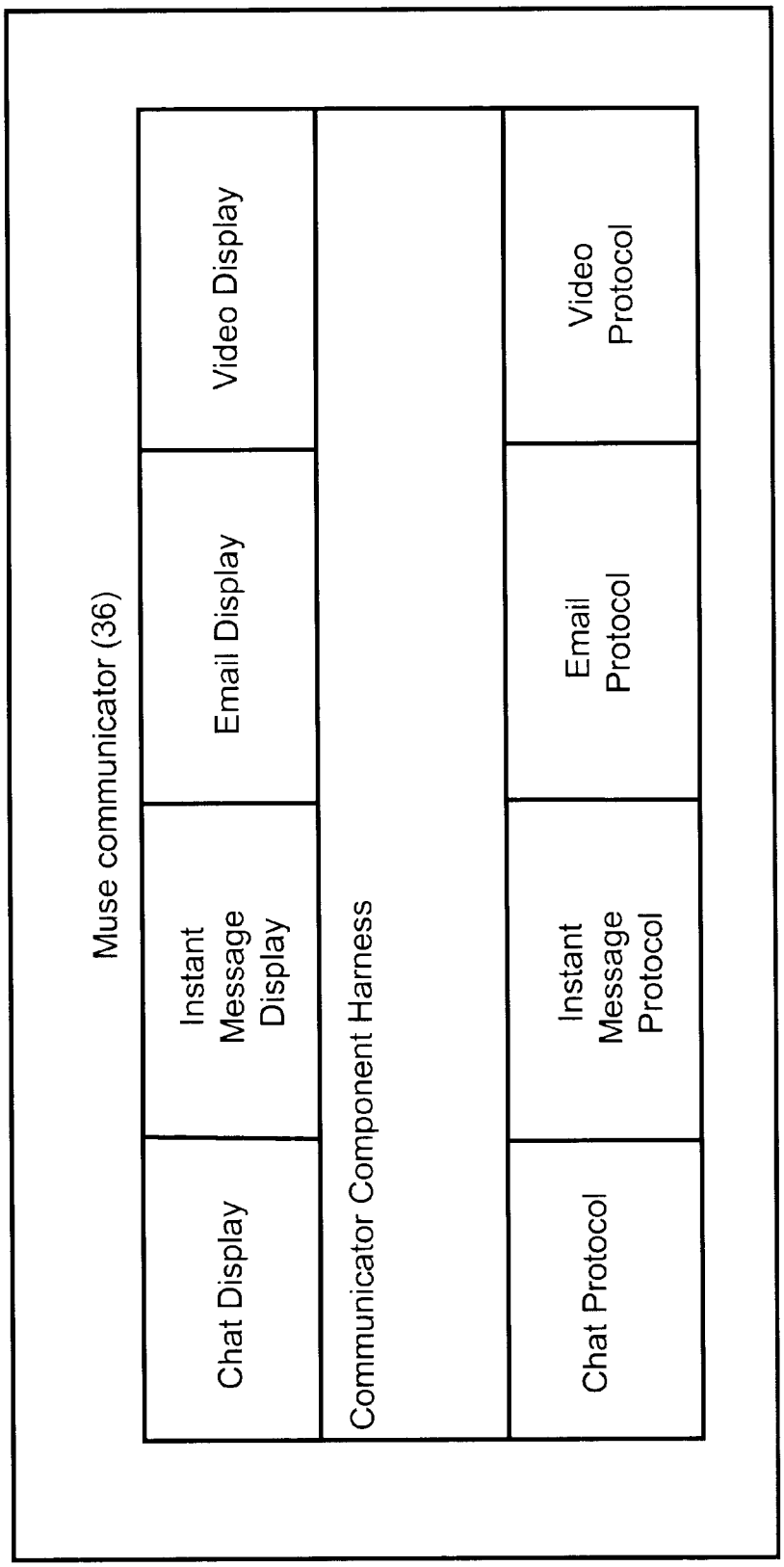
FIG. 10 shows a communicator architecure in accord with the present invention.

The Muse Communicator 36 integrates the functionality of a number of different communication technologies and protocols to provide a simple interface to distributed communication for users of the Muse Browser 8. As shown in FIG. 10, the functionality integrated by the Muse Communicator includes multi-user chat, instant messaging, email, voice over IP (VoIP) and video conferencing. The Muse Communicator 36 is a complicated piece of software in its own right, allowing extensions to the protocols and display mechanisms for the various communication styles. For instance, if a user wants to have an instant messaging session with another user that only has access to email, the email protocol plugin will be used but it will display the session in an instant messaging display. This routing of protocol to display is done by the Muse Communicator Component Harness which manages the capabilities and compatibility of the various display and protocol components. This blurs the lines of how these protocols are typically used in an effort to isolate the user of the Muse Communicator 36 from having to know unnecessary details about the capabilities of another user.

The Muse Communicator 36 also encompasses a few concepts that relate data to specific individuals. This includes the information associated with email address books as well as the present status associated with buddy lists. In addition to this information, Communicator 36 keeps information about the different kinds of communications capabilities different users have. For instance, Communicator 36 keeps track of whether a friend has an email address or VoIP capabilities. This information helps automate the process described above where a user without instant messaging capability would conduct an instant messaging session over email. All of this occurs without the user's knowledge once the Communicator 36 has just a few pieces of information. In contrast to typical buddy list applications, Communicator 36 will not only be able to alert you to a buddy's online presence, but Communicator 36 will also be able to indicate which Muse Interactivity Server 10 a user is currently visiting. This information could be used to chart buddy's journeys throughout the entirety of the Muse universe. Of course, the ability to log another user's browsing activity would have to be granted to a user and cannot be used maliciously by unauthorized individuals. The information that the Communicator 36 keeps about other users is managed in the relational manner described in the Muse 3D GUI 30 Toolkit section. This use of the relational system allows a user to view and search for information about friends in a way coupled from cumbersome directory and file system searching.

Muzilla

Muzilla 40 is a port of the Mozilla web browser to the Muse Environment. The best technology in 2D web presentation is available to Muse users, in accord with the present invention, within the 3D environment. This application is also embeddable in other applications to allow for Muse Applications to be web-enabled.

Muzilla 40 is a Muse Application for browsing traditional HTML web sites. This application, like all Muse Applications, runs inside the 3D environment and can be arbitrarily placed in the 3D environment when run as a stand-alone application. This application can also be run when content references a web page for display as a part of the environment. Muzilla 40 can also be used as part of the Muse WebWrap application which is discussed in the next section.

Like all Muse Components, the Muzilla 40 application is accessible through an interface class that is invariant except during major releases of the software. This keeps other components that rely on Muzilla 40 from having to update every time a new release of Muzilla 40 is downloaded. This also allows us to use any technology as an implementation of the web browsing capabilities. Muzilla 40 may use "Mozilla", an open-source code base, as a starting point for development. Mozilla is architected in such a way as to allow us to replace the part of the source code that uses a 2D GUI toolkit with code that uses the Muse 3D GUI 30 Toolkit. Using the Mozilla code base also ensures that the browser 8 will function as a state-of-the-art, standards-compliant browser 8. For strategic or technical reasons, the preferred implementation may be replaced by an implementation that has a smaller memory footprint, greater performance or better standards compliance.

Muse WebWrap

The Muse Browser 8 is geared towards viewing 3D content from the ground up. But, some content will be slow to transition over to a 3D representation. In order to leverage all of the existing 2D content, and still provide a shared environment for browsing, the Muse WebWrap application 38 is used. This webwrap application 38 will be invoked whenever a Muse Browser 8 browses to a site for which there is no existing Muse 3D content. In this case, the Muse Browser 8 will be forwarded to a Muse Community Server set up specifically for cataloging WebWrap 38 content. This server will instruct the browser where to find a Muse Interactivity Server 10 hosting the environment for the desired site. If the desired site is not currently being served by a Muse Interactivity Server 10, one will be launched and stay active until a configurable amount of inactivity occurs on the site. Once at the site, the WebWrap 38 application will coordinate the sharing of a number of pieces of information related to the site. This information will include related links and comments left by other users viewing the same site. The centerpiece of the environment will be a Muzilla window showing the content of the HTML web site for which the WebWrap site has been created.

The preferred personal computer setup for using the Muse Client 1.0 includes:

Pentium 400 Mhz class processor or faster.

Windows 95/98/NT4.0 with current system updates. Platforms including Linux, MacOS and others also may be used.

64 MB RAM or higher, to ensure that not too much virtual memory will be used because there is not enough RAM, which can reduce the overall performance of the Muse Client.

16 MB video card with hardware OpenGL acceleration capable of 10,000 textured, lit polygons at interactive rates (15 hz+). Lower performance graphics cards will work, but the interactivity of the Muse Client relies on hardware 3D acceleration, just like today's 2D desktop relies on 2D graphics acceleration.

SoundBlaster compatible audio card

Broad band (384 Kbps downstream) internet access. Lower bandwidths will generally work, but with longer download times and longer latency for distributed interaction.

Muse NetX: A server-finder application for a number of different network applications ranging from interactive games to ShoutCast sites.

Muse Interactivity Server

The Muse Interactivity Server 10 enables the multi-user aspects of the Muse Software Platform. In order for a Muse Browser 8 to experience Muse Content, the Muse Browser 8 connects to a Muse Interactivity Server 10. Upon initial login, the Browser 8 connects to the Muse Interactivity Server 10 chosen by a user preference. By default this will be the Muse Portal, which catalogs and glues together other Muse Content sites.

The Muse Interactivity Server 10 enables the shared environment capabilities of the Muse Client 8. While the Interactivity Server 10 is described as a stand-alone application, it is actually a tightly integrated part of the Muse Client 8. The Interactivity Server 10 is invoked when a user (individuals and business users alike) wants to make interactive Muse Content available to other Muse Clients. The tight coupling of the Muse Client 8 and Muse Interactivity Server 10 allows developers to create components for only one set of APIs that are applicable to both client and server tasks. To enable corporate and dedicated use of the Interactivity Server 10, the Client 8 can be run in stand-alone mode which requires no graphics or interactive user input.

An advantage of tightly coupling the Muse Client 8 and Muse Interactivity Server 10 in this way is illustrated by the desire of company XX to have an interactive help desk attendant, which may be a bot object running on instructions from a programmed processor or a representation of a real person and interacts with the client on behalf of the real person representative of company XX at their Muse Site. The help desk attendant may be programmed to interact with any Client that starts a chat session, and then respond accordingly, possibly finding answers in a company's help database. Company XX could then develop a component that uses a number of the Muse APIs:

The Chat API, to listen for any questions and respond to each individual that asks a question.

The Communication API to send information about how to animate the visual representation of the help desk attendant.

The 3D API, to animate the visual representation of the help desk attendant on all clients viewing the attendant.

Because these APIs exist in the client, and are required whether a component is carrying out the server side, or the client side of the task, the present invention unifies all development for components on one application and one set of APIs. The only major thing that differentiates the server side from the client side in this example is the direction of communications.

Figure 11A:
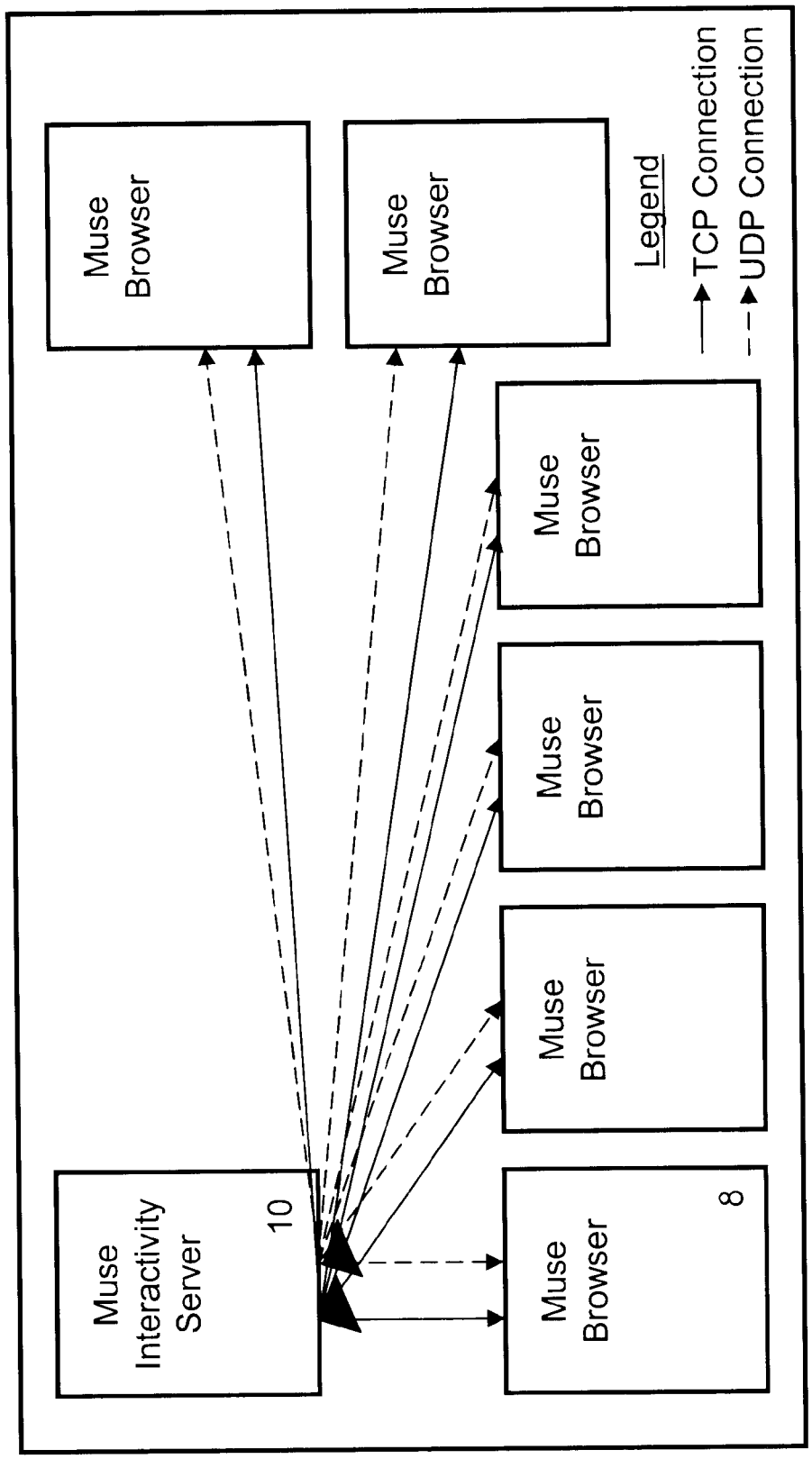
FIG. 11a illustrates interactivity server-browser and browser-browser interconnections in accord with the present invention.

A connection to a Muse Interactivity Server 10 is essentially a few TCP/IP connections from a Muse Browser 8 to an Interactivity Server 10. Depending on certain parameters, there will generally be one TCP connection and one UDP connection per Browser 8, as shown in FIG. 11a. The TCP connection is used for high reliability messaging and the UDP is used for lower reliability and higher bandwidth messaging. Another depiction of the interaction between the various clients 8 and the interactivity server 10 is shown in FIG. 11b. The additional functionality available to a client running a server is the Muse Interactivity Server APIs. These APIs allow for the administration of the server. The administrative aspects include:

The ability to impose a specific visual representation for all clients on the server The ability to control the visibility of one client to another client . . . and to use this mechanism for load balancing.

The ability to force some subset of communications to be forwarded through the server for validation and arbitration.

The ability to authenticate access to different parts of the Muse Site being served.

Specification of the representation (3D, Audio, etc.) of the Muse Site being served.

An advantage of the Muse Interactivity Server is that it facilitates routing and arbitrating of communications between any connected clients. Communication between clients can be classified in a number of different categories:

Reliability: High or Low reliability loosely equates to the underlying protocol (UDP or TCP) for data transmission.

Priority: A well defined priority scale allows communications to be deferred to do more efficient transmissions or causes messages to be sent immediately for real-time performance.

Validation: Messages flagged for validation will be routed through the server for validation and arbitration. Otherwise, these message can pass directly to other clients in a peer-to-peer model.

Enabling these communication qualities is the Muse Communication API, which is a higher level abstraction over TCP/IP communications. This layer allows the underlying Muse communications libraries to optimize network traffic based on load, priority, latency and other factors. It also allows for communications to be transparently encrypted and compressed without complicating the development process. Because Muse components use the Muse Communication API, they will never need to know about platform specific communication issues, and they will benefit from any enhancements Muse makes to the communication implementation. The centralization of communication also allows the implementation to flag malicious flooding of the network and to authenticate destinations for messages. Of course, components can always choose to use their own communication methodologies, which is an important part of the Muse strategy for integrating standards based technologies in the areas of voice over IP (VoIP) or video conferencing, which use the H.323 standard.

The requirements for serving an interactive Muse Site are different for different kinds of sites. The factors that affect CPU and network usage include the number of users on a site, the number of users interacting on a site, the level of validation and arbitration of messages on a site, and amount of animation and special effects driven by the site. For instance, a site that allowed 20 users to interact with each other based on proximity, not validating any messages could support hundreds of users on a typical server-class machine. On the other hand, a server that allowed all users to interact with each other and validated all messages, would only support a few dozen users on a typical server-class machine. But, there are so many factors that influence scalability, such as connection speed, CPU speed, available memory, etc. For the home user running a server, a minimally validating server for a few dozen clients should have negligible overhead. For a corporate user, a dedicated machine could be able to handle several hundred users or more. These requirements are strictly for serving the interactive aspect of the site. Additional resources or machines should also be allocated for:

Serving up content (through traditional HTTP and FTP)

Satisfying e-commerce transactions (through SSL and HTTPS) The amount of resources allocated to these other tasks should be easy to judge based on the projected number of clients, because these are the exact kinds of tasks that today's e-commerce infrastructure is based on. Specifically, if 20 machines are currently serving 10 GB of web content and fulfilling 10,000 transactions per day, these 20 machines will continue to satisfy that role for dealing with Muse Clients. But, in addition to these 20 machines, an additional 10 (for example) machines will be required to handle the interactive portion of the Muse Site.

Upon connection the Interactivity Server 10 and the Rrowser 8 will arbitrate a number of parameters and then allow communication through the Muse Communication Protocol 26. One of the first messages to be transferred to the Browser 8 will be a specification of the content on the Interactivity Server 10 and the current state of the content. Soon after this, messages about all of the neighboring users on the interactivity server 10 are sent to the Browser 8. At this point, the Browser 8 enters its normal interactive state.

Currently, a Browser 8 can only connect to one Interactivity Server 10 at a time. This constraint is rather logical considering that a connection to an Interactivity Server 10 corresponds to being "at" the pseudo-physical location of the server 10, and it is rather difficult to be in two places at once. This restriction does not mean, however, that users cannot communicate (chat, email, etc.) with users on other Interactivity Servers 10.

On the other hand, an Interactivity Server 10 can support a great number of connections from Browsers 8. The actual number depends on the capabilities of the server machine including CPU speed, memory, and network bandwidth. Other factors also affect the number of users an Interactivity Server 10 can support, including the number of users that are configured to interact with each other and the kind of Muse Components that are running on the Interactivity Server 10. Interactivity Servers 10 can expect to support anywhere from a handful of users on a highly loaded server, to thousands of users. Many users are possible on a server that is very powerful, is not running too many extraneous services and is only allowing a small subset of the connected users to interact with each other.

Muse Interactivity Servers 10 are extensible. Extensibility allows many important activities to be conducted in the Muse Software Platform. Among these are:

Interaction with a company's product database

Help desk style interaction with product support agents

Synchronized animation of important content in the 3D environment including advertisements Creation of 3D content conected "on-the-fly" based on user input Extension to the Muse Interactivity Server 10 is done in the same fashion as extension to the Muse Browser 8. In fact, it is done in exactly the same way. In an effort to exploit the knowledge developers get by developing on the Muse Browser APIs, the Interactivity Ser 10 presents the same APIs. This is done for more than the simplicity of not having to learn additional interfaces. It is also done because the problem space of the Interactivity Server 10 is so similar to that of the Browser 8. For instance, a component on the Interactivity Server 10 that animates a part of the content needs to mirror that animation on all connected Browsers 8. In both cases, the components for the Interactivity Server 10 and Browser 8 need access to the 3D visualization APIs 18, the Communication APIs 26 and the Animation Engine APIs 32. Muse has identified this pattern of reuse and ensured that Interactivity Server 10 and Browser 8 APIs provide the same capabilities. Of course, there are a few specific niches where APIs exist on the Interactivity Server 10 and not on the Browser 8. These APIs have to do with configuration of the Interactivity Server 10 and logging of Interactivity Server 10 activity.

Muse Community Server

Figure 12A:
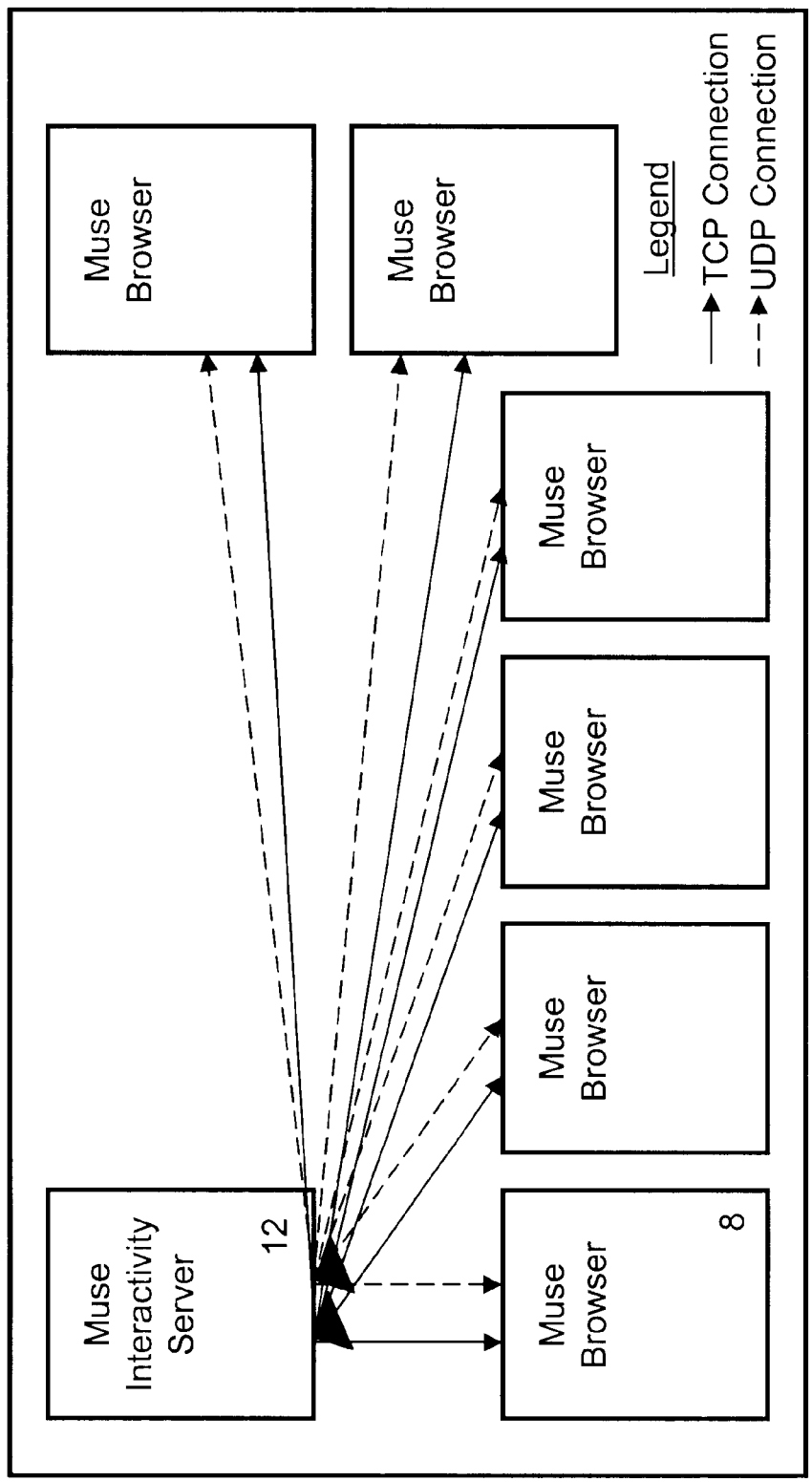
FIG. 12a illustrates community server-browser interconnections in accord with the present invention.

The Muse Community Server 12 holds together the fabric of the Muse Software Plafform. The Muse community server 12 application allows Muse Browsers 8 to authenticate Muse IDs, keep track of the presence of other Muse users and find the location of a Muse Interactivity Server 10 for a Muse WebWrap site. Muse Browsers 8 will connect to the Community Server 12 in a manner illustrated at FIG. 12, and preferably for a number of different reasons including any or all of the following:

Initial Registration

Login Authentication

Buddy Online Presence Status and other "buddy list" applications

WebWrap Site Locations

Meta-Server Information

Preferred communication methods (email, instant messaging, VoIP, etc.)

Online status (busy, away from desk, ready for chat, etc.)

Muse location (Muse Site and latitude longitude)

Geographical location (actual geographical location)

A Muse Client will communicate to the Muse Community Server periodically while it is online for a number of reasons:

To register as a Muse user

To login and logout

To receive updates about a friend's login or logout

To receive updates about a friend's change of location

To find the best way to contact another user

To notify other friends of changes to online status

Figure 12B:
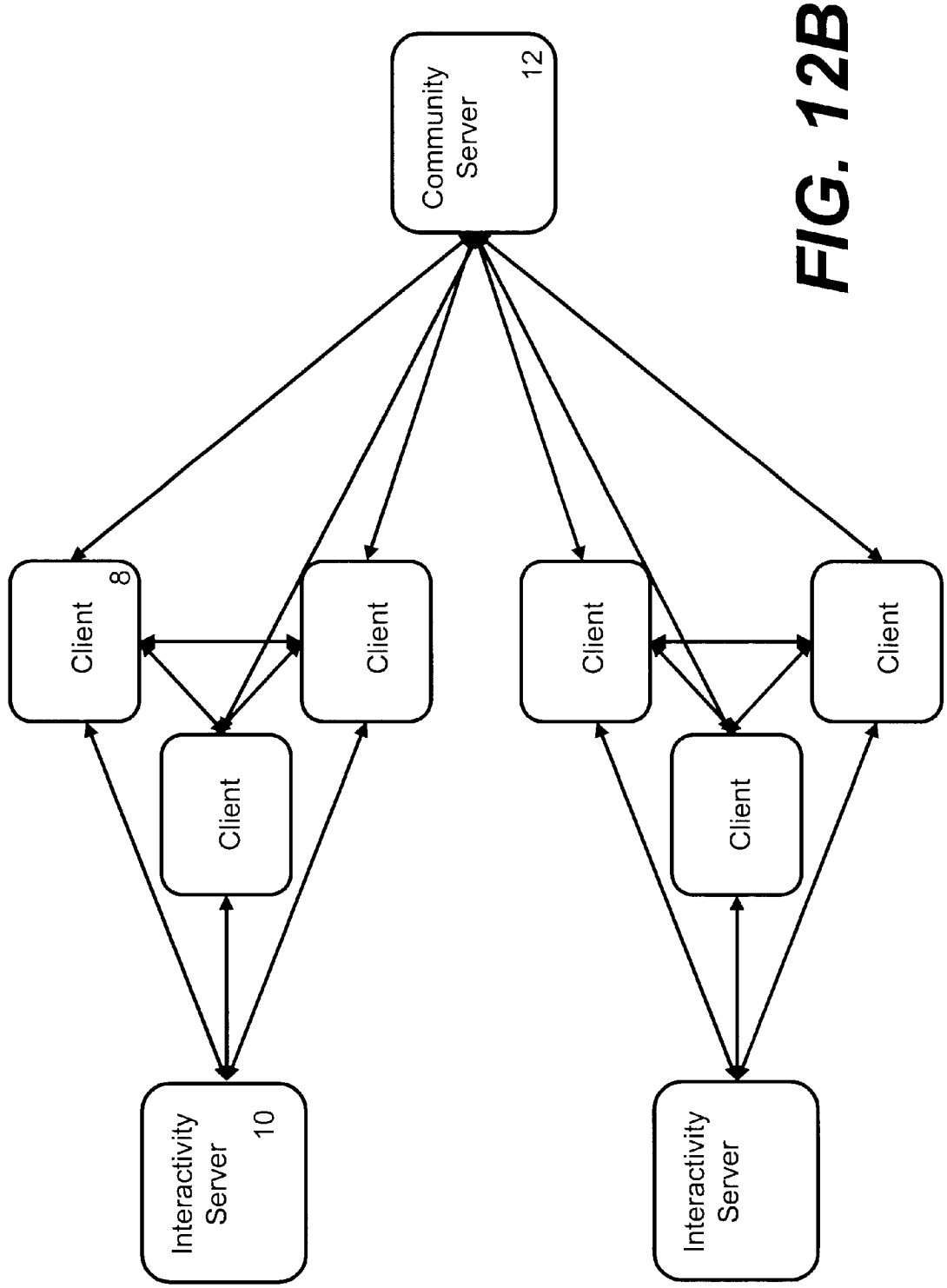
FIG. 12b illustrates community server-browser and browser-browser interconnections in accord with the present invention.

FIG. 12b illustrates the connectivity of the community server 12 with the clients 8 and interactivity servers 10, demonstrating the different communication interactions within the Muse Environment:

In essence, the Muse Community Servers 12 are for informational transactions, not for managing the interactive state of any particular Muse Site. Their bandwidth requirements are low, per transaction, but because they may be used to serve the entire Muse Environment, and can potentially handle tens of millions of hits per day throughout the distributed network of Muse Community Servers 12. More Muse Community Servers may be brought online as the community grows, and servers can be geographically distributed both for maximum redundancy and to be as close to users as possible. Any access that third parties will have to information stored in the databases of the Muse Community Servers 12 is through documented Muse Client APIs and some information will require strict authentication to access. For example, any access to sensitive user information is only granted with the user's intervention (ID/password/key authentication). But, if a user chooses to allow access to their site history, a Muse Site could use that information to predict what products a user might like to purchase, etc. This access is purely voluntary and can be granted on a per-site basis.

When a user first runs the Muse Browser 8, it will connect to a pre-selected Muse Community Server 12 and engage in the registration process. After completion of this process, the user will have been allocated a unique Muse ID and space will be allocated on the Muse Community Server 12 for other information related to the user.

Every time a user executes the Muse Browser 8 application, the Browser 8 will connect to the Muse Community Server 12 and authenticate the user's identity and allow the Browser 8 to browse Muse Interactivity Server 12 sites. Both the registration and the login process are done with the Community Server 12 over a TCP connection with security measures in place.

The Muse Community Server 12 is also responsible for tracking recent information about user's online status and other presence information. While the Community Server 12 is responsible for storing and communicating changes to this information, it is the Muse Browser's 8 responsibility to periodically send status updates to the Community Server 12. This avoids a great deal of administrative overhead on the part of the Community Server 12, as it does not have to poll Browsers 8 for their status. The Community Server 12 does periodically reap the presence status of Browsers 8 that have not updated in a specified amount of time. The Community Server 12 will communicate this information to Browsers 8 that are being used by buddys of the user for which information is being requested.

Muse WebWrap information is also stored and served by the Muse Community Server 12. The Community Server 12 keeps track of the sites that have Muse Interactivity Servers 10, and the sites that do not. In the case of sites that do not have Interactivity Servers 10, the Muse Community Server12 will create a WebWrap site on a new Interactivity Server 10 hosted by Muse or one of its partners. If a WebWrap Interactivity Server 10 already exists for a given address, the Community Server 12 will not create the site, but merely refer the Browser 8 to that existing WebWrap site. When a site does create their own custom Muse Site, the WebWrap application 38 will detect this and no longer forward to the Community Server 12 or use the WebWrap application 38 to browse the site.

Throughout this section, the Muse Community Server 12 has been portrayed as a single server application. In fact, the Community Server 12 is preferably actually a highly distributed collection of hardware and software, which together provides all of the described functionality. For instance, login and authentication is served by a number of geographically distributed Muse Community Login and Authentication Servers 12, while presence status is handled by another set of Muse Community Presence Servers 12 and WebWrap information is served by yet another collection of Muse Community WebWrap Servers 12. The distribution of the servers and the separation of their responsibilities allow the Muse Software Platform to scale enough to eventually support millions of users or more. To support this distribution, redundancy and scalability, the Muse Community Servers 12 are internally using LDAP accessed externally through Muse Communication Protocols 26. In order to manage distribution of this information, Muse Community Servers 12 preferably act as meta-servers. Browsers 8 are able to query a Community Server 12 in order to find out where different types of information are stored on other Community Servers 12. This mechanism will also be exploited to ensure that Browsers 8 connect to the Community Servers 12 that are geographically closest to the Browser 8 to minimize latency and distribute load throughout the Community Servers 12.

Glossary (Incorporated by References are the following glossary sources:

http://www.whatis.com, http://www.webreference.com)

Address book:

A common feature of email software that allows the storing and retrieving of individual's email addresses.

Authentication:

Authentication is the process of determining whether someone or something is, in fact, who or what it is declared to be. In private and public computer networks (including the Internet), authentication is commonly done through the use of logon passwords. Knowledge of the password is assumed to guarantee that the user is authentic. Each user registers initially (or is registered by someone else), using an assigned or self-declared password. On each subsequent use, the user must know and use the previously declared password. The weakness in this system for transactions that are significant (such as the exchange of money) is that passwords can often be stolen, accidentally revealed, or forgotten.

For this reason, Internet business and many other transactions require a more stringent authentication process. The use of digital certificates issued and verified by a Certificate Authority (CA) as part of a Public Key Infrastructure is considered likely to become the standard way to perform authentication on the Internet.

Logically, authentication precedes authorization (although they may often seem to be combined).

API:

An API (application program interface) is the specific method prescribed by a computer operating system or by another application program by which a programmer writing an application program can make requests of the operating system or another application.

Binary compatibility:

The ability of an element of a software system to be changed by developers without becoming incompatible with the rest of the existing software system Binary component/executable:

An executable is a file that contains a program—that is, a particular kind of file that is capable of being executed or run as a program in the computer. In a DOS or Windows operating system, an executable file usually has a file name extension of .bat, .com, or .exe. An executable file or a group of them are sometimes referred to as binaries as in "I'll download the binaries to you" since the file format of an executable is a solid sequence of binary values that cannot be easily read by anyone (unlike that of, for example, an ASCII text file which can be easily examined for information as it travels from one computer to another).

A component is very similar to an executable, in that it is not human-readable. But a component differs in that it only represents part of an executables behavior, rather than the entire behavior of an executable. An executable might us any number of components in order to composite its overall behavior.

Buddy list:

A list of users for which presence information should be tracked. Typically, friends, family and coworkers are added to buddy lists in order to know when they are online and available for chat or instant messaging.

Client:

A client is the requesting program or user in a client/server relationship. For example, the user of a Web browser is effectively making client requests for pages from servers all over the Web. The browser itself is a client in its relationship with the computer that is getting and returning the requested HTML file. The computer handling the request and sending back the HTML file is a server.

Client/Server:

Client/server describes the relationship between two computer programs in which one program, the client, makes a service request from another program, the server, which fulfills the request. Although the client/server idea can be used by programs within a single computer, it is a more important idea in a network. In a network, the client/server model provides a convenient way to interconnect programs that are distributed efficiently across different locations.

The client/server model has become one of the central ideas of network computing. Most business applications being written today use the client/server model. So does the Internet's main program, TCP/IP.

In the usual client/server model, one server, sometimes called a daemon, is activated and awaits client requests. Typically, multiple client programs share the services of a common server program. Both client programs and server programs are often part of a larger program or application.

Codec:

The term codec is also an acronym that stands for "compression/decompression." A codec is an algorithm, or specialized computer program, that reduces the number of bytes consumed by large files and programs.

In order to minimize the amount of storage space required for a complicated file, such as a video, compression is used. Compression works by eliminating redundancies in data. Compression can be done for any kind of file, including text, programs, images, audio, video, and virtual reality (VR). Compression can reduce the size of a file by a factor of 100 or more in some cases. For example, a 15-megabyte video might be reduced to 150 kilobytes. The uncompressed file would be far too large to download from the Web in a reasonable length of time, but the compressed file could usually be downloaded in a few seconds. For viewing, a decompression algorithm, which "undoes" the compression, would have to be used.

There are numerous standard codec schemes. Some are used mainly to minimize file transfer time, and are employed on the Internet. Others are intended to maximize the data that can be stored in a given amount of disk space, or on a CD-ROM.

Codecs are used in many popular Internet products, including QuickTime, Netmeeting, Cu-Seeme, and VDO-phone.

MCOM:

COM (Component Object Model) is Microsoft's framework for developing and supporting program component objects. It is aimed at providing similar capabilities to those defined in CORBA (Common Object Request Broker Architecture), a framework for the interoperation of distributed objects in a network that is supported by other major companies in the computer industry. Whereas Microsoft's OLE provides services for the compound document that users see on their display, COM provides the underlying services of interface negotiation, life cycle management (determining when an object can be removed from a system), licensing, and event services (putting one object into service as the result of an event that has happened to another object).

Communication protocol:

In information technology, a protocol (pronounced PROH-tuh-cahl, from the Greek protocollon, which was a leaf of paper glued to a manuscript volume, describing its contents) is the special set of rules for communicating that the end points in a telecommunication connection use when they send signals back and forth.

Protocols exist at several levels in a telecommunication connection. There are hardware telephone protocols. There are protocols between the end points in communicating programs within the same computer or at different locations. Both end points must recognize and observe the protocol. Protocols are often described in an industry or international standard.

Component:

In object-oriented programming and distributed object technology, a component is a reusable program building block that can be combined with other components in the same or other computers in a distributed network to form an application. Examples of a component include: a single button in a graphical user interface, a small interest calculator, an interface to a database manager. Components can be deployed on different servers in a network and communicate with each other for needed services. A component runs within a context called a container. Examples of containers include pages on a Web site, Web browsers, and word processors.

Composite widget:
A widget composed of any number of sub-widgets that presents itself as a single widget during the software development process.

CORBA:
CORBA is an architecture and specification for creating, distributing, and managing distributed program objects in a network. It allows programs at different locations and developed by different vendors to communicate in a network through an "interface broker." CORBA was developed by a consortium of vendors through the Object Management Group (OMG), which currently includes over 500 member companies. Both ISO and X/Open have sanctioned CORBA as the standard architecture for distributed objects (which are also known as components). CORBA 2.0 is the latest level.

The essential concept in CORBA is the Object Request Broker (ORB). ORB support in a network of clients and servers on different computers means that a client program (which may itself be an object) can request services from a server program or object without having to understand where the server is in a distributed network or what the interface to the server program looks like. To make requests or return replies between the ORBs, programs use the General Inter-ORB Protocol (GIOP) and, for the Internet, its Internet Inter-ORB Protocol (IIOP). IIOP maps GIOP requests and replies to the Internet's Transmission Control Protocol (TCP) layer in each computer.

Data marshalling:
In computer programming, marshalling is the process of gathering data from one or more applications or non-contiguous sources in computer storage, putting the data pieces into a message buffer, and organizing or converting the data into a format that is prescribed for a particular receiver or programming interface.

Marshalling is usually required when passing the output parameters of a program written in one language as input to a program written in another language.

Dynamically updateable:
The ability to update an element of a software system without having to restart the system to take advantage of the update.

GUI:
A GUI is a graphical (rather than purely textual) user interface to a computer.

Today's major operating systems provide a graphical user interface. Applications typically use the elements of the GUI that come with the operating system and add their own graphical user interface elements and ideas. A GUI sometimes uses one or more metaphors for objects familiar in real life, such as the desktop, the view through a window, or the physical layout in a building. Elements of a GUI include such things as: windows, pull-down menus, buttons, scroll bars, iconic images, wizards, the mouse, and more. A system's graphical user interface along with its input devices is sometimes referred to as its "look-and-feel."

Key frame animation:
A technique for efficiently authoring and storing information about an object with respect to time. A number of properties of an object can be animated in this manner, with position and orientation being among the most common. This technique only stores the information about an object's properties at specific times, known as key frames. When the animation is played back, times between key frames are interpolated to give the appearance of smooth animation.

Latency:
In a network, latency, a synonym for delay, is an expression of how much time it takes for a packet of data to get from one designated point to another. In some usages (for example, AT&T), latency is measured by sending a packet that will be returned back to the sender and thus the round-trip time is considered the latency.

The latency assumption seems to be that data should be transmitted instantly between one point and another (that is, with no delay at all). The contributors to network latency include:

Propagation: This is simply the time it takes for a packet to travel between one place and another at the speed of light.

Transmission: The medium itself (whether fiber optic cable, wireless, or some other) introduces some delay. The size of the packet introduces delay in a round-trip since a larger packet will take longer to receive and return than a short one.

Router and other processing: Each gateway node takes time to examine and possibly change the header in a packet (for example, changing the hop count in the time-to-live field).

Other computer and storage delays: Within networks at each end of the journey, a packet may be subject to storage and hard disk access delays at intermediate devices such as switches and bridges. (In backbone statistics, however, this kind of latency is probably not considered.)

LDAP:
LDAP (Lightweight Directory Access Protocol) is a software protocol for enabling anyone to locate organizations, individuals, and other resources such as files and devices in a network, whether on the Internet or on a corporate intranet. LDAP is a "lightweight" (smaller amount of code) version of DAP (Directory Access Protocol), which is part of X.500, a standard for directory services in a network. LDAP is lighter because in its initial version it did not include security features. LDAP originated at the University of Michigan and has been endorsed by at least 40 companies. Netscape includes it in its latest Communicator suite of products. Microsoft includes it as part of what it calls Active Directory in a number of products including Outlook Express. Novell's NetWare Directory Services interoperates with LDAP. Cisco also supports it in its networking products.

In a network, a directory tells you where in the network something is located. On TCP/IP networks (including the Internet), the Domain Name System (DNS) is the directory system used to relate the domain name to a specific network address (a unique location on the network). However, you may not know the domain name. LDAP allows you to search for an individual without knowing where they're located (although additional information will help with the search).

An LDAP directory is organized in a simple "tree" hierarchy consisting of the following levels:
The "root" directory (the starting place or the source of the tree), which branches out to
Countries, each of which branches out to Organizations, which branch out to
Organizational units (divisions, departments, and so forth), which branches out to (includes an entry for)

Individuals (which includes people, files, and shared resources such as printers)

An LDAP directory can be distributed among many servers. Each server can have a replicated version of the total directory that is synchronized periodically. An LDAP server is called a Directory System Agent (DSA). An LDAP server that receives a request from a user takes responsibility for the request, passing it to other DSAs as necessary, but ensuring a single coordinated response for the user.

Mesh:

In the language of 3-D graphics, a model or mesh is a data file that contains the information needed to view or "render" a 3-D object. The mesh describes the geometric shape of the object.

The typical mesh divides its geometry information into two parts. First, there is a list of points representing the vertices of the polygons as (x,y,z) coordinates.

Vertex List:

Point 1 (x,y,z)

Point 2 (x,y,z)

Point 3 (x,y,z)

Point 4 (x,y,z)

Point . . .

Point 10 (x,y,z)

Second, this list of points is used to describe polygons.

Polygon List:

Polygon 1 (Point 1, Point 2, Point 3, Point 4)

Polygon 2 (Point 4, Point 5, Point 7, Point 9)

. . .

Polygon 6 (Point 3, Point 5, Point 6, Point 10)

This approach has the advantage of keeping polygons connected. If the coordinates of any point are changed in the Vertex List, the change is necessarily reflected in every polygon on the Polygon List that uses that point as a vertex.

Motion model:

A set of software algorithms that approximate the physics of motion for a specific object. Motion models are commonly developed for cars, airplanes and even walking or running humans Observer pattern:

The Observer pattern defines an one-to-many dependency between a subject object and any number of observer objects so that when the subject object changes state, all its observer objects are notified and updated automatically. The Observer pattern is also known as Dependents and Publish-Subscribe.

Online status/presence:

Presence and Instant Messaging have recently emerged as a new medium of communications over the Internet. Presence is a means for finding, retrieving, and subscribing to changes in the presence information (e.g. "online" or "offline") of other users. Instant messaging is a means for sending small, simple messages that are delivered immediately to online users.

Applications of presence and instant messaging currently use independent, non-standard and non-interoperable protocols developed by various vendors. The goal of the Instant Messaging and Presence Protocol (IMPP) Working Group is to define a standard protocol so that independently developed applications of instant messaging and/or presence can interoperate across the Internet. This document defines a minimal set of requirements that IMPP must meet.

Reverse engineering:

The process of recreating a design by analyzing a final product. Reverse engineering is common in both hardware and software. Several companies have succeeded in producing Intel-compatible microprocessors through reverse engineering. Whether reverse engineering is legal or not depends on who you ask. The courts have not yet made a definitive ruling.

QOS:

On the Internet and in other networks, QoS (Quality of Service) is the idea that transmission rates, error rates, and other characteristics can be measured, improved, and, to some extent, guaranteed in advance. QoS is of particular concern for the continuous transmission of high-bandwidth video and multimedia information. Transmitting this kind of content dependably is difficult in public networks using ordinary "best effort" protocols.

Using the Internet's Resource Reservation Protocol (RSVP), packets passing through a gateway host can be expedited based on policy and reservation criteria arranged in advance. Using ATM, which also lets a company or user preselect a level of quality in terms of service, QoS can be measured and guaranteed in terms of the average delay at a gateway, the variation in delay in a group of cells (cells are 53-byte transmission units), cell losses, and the transmission error rate.

Scene graph:

A data structure for representing elements of a 3D scene and their relationships. Scene graphs represent hierarchical relationships between elements in the scene and their state. The hierarchical nature of the graph makes it very easy and efficient to manipulate elements of the scene by manipulating their parent in the graph.

Server:

In general, a server is a computer program that provides services to other computer programs in the same or other computers.

In the client/server programming model, a server is a program that awaits and fulfills requests from client programs in the same or other computers. A given application in a computer may function as a client with requests for services from other programs and a server of requests from other programs.

The computer that a server program runs in is also frequently referred to as a server (though it may contain a number of server and client programs).

Site:

A Web site is a collection of Web files on a particular subject that includes a beginning file called a home page. For example, most companies, organizations, or individuals that have Web sites have a single address that they give you. This is their home page address. From the home page, you can get to all the other pages on their site. For example, the Web site for IBM has the home page address of http://www.ibm.com. (In this case, the actual file name of the home page file doesn't have to be included because IBM has named this file index.html and told the server that this address really means http://www.ibm.com/index.html.) Since it sounds like geography is involved, a Web site is rather easily confused with a Web server. A server is a computer that holds the files for one or more sites. On one hand, a very large Web site may reside on a number of servers that may be in different geographic locations. IBM is a good example; its Web site consists of thousands of files spread out over many servers in world-wide locations. But a more typical example is probably the site you are looking at, whatis.com. We reside on a commercial space provider's server with a number of other sites that have nothing to do with Internet glossaries.

A synonym and less frequently used term for Web site is "Web presence." That term seems to better express the idea that a site is not tied to specific geographic location, but is "somewhere in cyberspace." However, "Web site" seems to be used much more frequently.

You can have multiple Web sites that cross-link to files on each others' sites. This simply means that you've identified two starting places or home pages for all the files.

In this document the definition of site is broadened to include Muse Interactivity Servers. In essence, any specific address of a server on the Internet can be viewed as a site for some kind of content or interaction.

Software script:

In computer programming, a script is a program or sequence of instructions that is interpreted or carried out by another program rather than by the computer processor (as a compiled program is).

Some languages have been conceived expressly as script languages. Among the most popular are Perl, REXX (on IBM mainframes), JavaScript, and Tcl/Tk. In the context of the World Wide Web, Perl, JBScript, and similar script languages are often written to handle forms input or other services for a Web site and are processed on the Web server. A JavaScript script in a Web page runs "client-side" on the Web browser.

In general, script languages are easier and faster to code in than the more structured and compiled languages such as C and C++ and are ideal for programs of very limited capability or that can reuse and tie together existing compiled programs. However, a script takes longer to run than a compiled program since each instruction is being handled by another program first (requiring additional instructions) rather than directly by the basic instruction processor.

Software executable:

An executable is a file that contains a program—that is, a particular kind of file that is capable of being executed or run as a program in the computer. In a DOS or Windows operating system, an executable file usually has a file name extension of .bat, .com, or .exe. An executable file or a group of them are sometimes referred to as binaries.

Software plugin:

Plug-in applications are programs that can easily be installed and used as part of a main executable. For example, the Netscape browser allowed you to download, install, and define supplementary programs that played sound or motion video or performed other functions. These were called helper applications. However, these applications run as a separate application and require that a second window be opened. A plug-in application is recognized automatically by it's host executable and its functions are integrated.

Spatialized Sound:

Sound filtered so that it seems to be localized in 3D space.

TCP/IP:

TCP/IP (Transmission Control Protocol/Internet Protocol) is the basic communication language or protocol of the Internet. It can also be used as a communications protocol in the private networks called intranets and in extranets.

TCP/IP uses the client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "connectionless" because each client request is considered a new request unrelated to any previous one (unlike ordinary phone conversations that require a dedicated connection for the call duration). Being connectionless frees network paths so that everyone can use them continuously. (Note that the TCP layer itself is not connectionless as far as any one message is concerned. Its connection remains in place until all packets in a message have been received.)

Texture:

An image applied to 3D geometry in order to simulate a complex surface or pattern. This allows for realistic surfaces to be rendered without the need for greater geometric complexity.

UDP:

UDP (User Datagram Protocol) is a communications method (protocol) that offers a limited amount of service when messages are exchanged between computers in a network that uses the Internet Protocol (IP). UDP is an alternative to the Transmission Control Protocol (TCP) and, together with IP, is sometimes referred to as UDP/IP. Like the Transmission Control Protocol, UDP uses the Internet Protocol to actually get a data unit (called a datagram) from one computer to another. Unlike TCP, however, UDP does not provide the service of dividing a message into packets (datagrams) and reassembling it at the other end.

Specifically, UDP doesn't provide sequencing of the packets that the data arrives in. This means that the application program that uses UDP must be able to make sure that the entire message has arrived and is in the right order. Network applications that want to save processing time because they have very small data units to exchange (and therefore very little message reassembling to do) may prefer UDP to TCP. The Trivial File Transfer Protocol (TFTP) uses UDP instead of TCP.

UDP provides two services not provided by the IP layer. It provides port numbers to help distinguish different user requests and, optionally, a checksum capability to verify that the data arrived intact.

URL:

A URL (Uniform Resource Locator) (pronounced YU-AHR-EHL or, in some quarters, UHRL) is the address of a file (resource) accessible on the Internet. The type of resource depends on the Internet application protocol. Using the World Wide Web's protocol, the Hypertext Transfer Protocol (HTTP), the resource can be an HTML page (like the one you're reading), an image file, a program such as a CGI application or Java applet, or any other file supported by HTTP. The URL contains the name of the protocol required to access the resource, a domain name that identifies a specific computer on the Internet, and a hierarchical description of a file location on the computer.

VoIP:

VoIP (voice over IP—that is, voice delivered using the Internet Protocol) is a term used in IP telephony for a set of facilities for managing the delivery of voice information using the Internet Protocol (IP). In general, this means sending voice information in digital form in discrete packets rather than in the traditional circuit-committed protocols of the public switched telephone network (PSTN). Dude K, Widget:

In computers, a widget is an element of a graphical user interface (GUI) that displays information or provides a specific way for a user to interact with the operating system and application programs. Widgets include icons, pull-down menus, buttons, selection boxes, progress indicators, on-off checkmarks, scroll bars, windows, window edges (that let you resize the window), toggle buttons, forms, and many other devices for displaying information and for inviting, accepting, and responding to user actions.

In programming, a widget also means the small program that is written in order to describe what a particular widget looks like, how it behaves, and how it interacts in response to user actions. Most operating systems include a set of ready-to-tailor widgets that a programmer can incorporate in an application, specifying how it is to behave. New widgets can be created. The term was apparently applied first in UNIX-based operating systems and the X window System. In object-oriented programming (OOP), each type of widget is defined as a class (or a subclass under a broad generic widget class) and is always associated with a particular window. In the AIX Enhanced X-Window Toolkit, a widget is the fundamental data type.

Window manager:

A windowing system is a system for sharing a computer's graphical display presentation resources among multiple applications at the same time. In a computer that has a graphical user interface (GUI), you may want to use a number of applications at the same time (this is called multitasking). Using a separate window for each application, you can interact with each application and go from one application to another without having to reinitiate it. Having different information or activities in multiple windows may also make it easier for you to do your work.

A windowing system uses a window manager to keep track of where each window is located on the display screen and its size and status. A windowing system doesn't just manage the windows but also other forms of graphical user interface entities (usually called widgets).

XML:

XML (Extensible Markup Language) is a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML.

Currently a formal recommendation from the World Wide Web Consortium (W3C). XML is similar to the language of today's Web pages, HTML. Both XML and HTML contain markup symbols to describe the contents of a page or file. HTML, however, describes the content of a Web page (mainly text and graphic images) only in terms of how it is to be displayed and interacted with. For example, a <P> starts a new paragraph. XML describes the content in terms of what data is being described. For example, a <PHONENUM> could indicate that the data that followed it was a phone number. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed.

XML is "extensible" because, unlike HTML, the markup symbols are unlimited and self-defining. XML is actually a simpler and easier-to-use subset of the Standard Generalized Markup Language (SGML), the standard for how to create a document structure.

What is claimed is:

1. A computer program that provides instructions for a first processor to locate and retrieve one or more of rich media, network resources, and hypermedia, multimedia and markup language files over a network for running in a three-dimensional (3D) graphical environment, said program comprising an external API and an internal API, and instructions for said first processor to perform operations of:

generating a first 3D graphical user interface for visualizing said environment on a first display;

generating a metaphorical first user object for navigating and interacting in three dimensions within said environment via navigational and interactional inputs, respectively, from a first user;

implementing a modification of a lower-level component of said program without modifying said external API, said external API being isolated from said modification by said internal API;

integrating a third object selected from the group consisting of a rich media object, a network resource, a hypermedia object and a markup language object into said environment; and interacting said first user object with said third object in response to a first interactional input from said first user.

2. The program of claim 1, further comprising instructions for said first processor to perform additional operations of:

generating a second user object for navigating and interacting in three dimensions within said environment via navigational and interactional inputs, respectively, from a second user via a second processor associated with said second user and connected over said network to said first processor.

3. A computer program for enabling multiple users to share a three dimensional (3D) environment and providing instructions for a first processor to locate and retrieve one or more of rich media, network resources, and hypermedia, multimedia and markup language files for running in said 3D environment, said program comprising an external API and an internal API, and instructions for said first processor to perform operations of:

generating a first 3D graphical user interface for visualizing said environment on a first display;

generating a metaphorical first user object for navigating and interacting in three dimensions within said environment via navigational and interactional inputs, respectively, from a first user;

generating a metaphorical second user object for navigating and interacting in three dimensions within said environment via navigational and interactional inputs, respectively, from a second user via a second processor associated with said second user and connected over a network to said first processor;

implementing a modification of a lower-level component of said program without modifying said external API, said external API being isolated from said modification by said internal API;

integrating a third object selected from the group consisting of a rich media object, a network resource, a hypermedia object and a markup language object into said environment; and interacting said first user object with said third object in response to a first interactional input from said first user.

4. The computer program of any of claim 2 or 3, further comprising instructions for said first processor to perform additional operations of:

interacting said first and second user objects with each other in response to a second interactional input from one of said first user and said second user.

5. A computer program for enabling multiple users to share a three-dimensional (3D) environment and for providing instructions for a first processor to locate and retrieve one or more of rich media, network resources, and hypermedia, multimedia and markup language files for running in said 3D environment, said program comprising an external API and an internal API, and instructions for said first processor to perform operations of:

generating a first 3D graphical user interface for visualizing said environment on a first display;

generating a metaphorical first user object for navigating and interacting in the three dimensions within said environment via navigational and interactional inputs, respectively, from a first user;

generating a metaphorical second user object for navigating and interacting in three dimensions within said environment via navigational and interactional inputs, respectively, from a second user via a second processor associated with said second user and connected over a network to said first processor;

integrating a third object selected from the group consisting of a rich media object, a network resource, a hypermedia object and a markup language object into said environment;

implementing a modification of a lower-level component of said program without modifying said external API, said external API being isolated from said modification by said internal API;

interacting said first user object with said third object in response to a first interactional input from said first user; and interacting said first and second user objects with each other in response to a second interactional input from one of said first user and said second user.

6. The program of any of claim 2, 3 or 5, said further comprising instructions for the first processor to perform additional operations of:

interacting said second user object with said third object in response to a third interactional input from said second user via second processor associated with said second user and connected over said network to said first processor.

7. The program of claim 6, further comprising instructions for said second processor to perform additional operations of:

generating a second 3D graphical user interface for visualizing said environment on a second display;

generating said metaphorical first user object for navigating and interacting in three dimensions within said environment via said navigational and interactional inputs, respectively, from said first user via said first processor over said network;

generating said metaphorical second user object for navigating and interacting in three dimensions within said environment via said navigational and interactional inputs, respectively, from said second user;

interacting said first user object with said third object in response to said first interactional input from said first user via said first processor over said network.

8. The program of claim 7, further comprising instructions for said second processor to perform additional operations of:

interacting said first and second user objects with each other in response to said second interactional input.

9. A computer program for enabling multiple users to share a three dimensional (3D) environment and providing instructions for a first processor and a second processor to locate and retrieve rich media, network resources, and hypermedia, multimedia and markup language files for running in said 3D environment, said program comprising an external API and an internal API, and instructions for said first processor to perform operations of:

generating a first 3D graphical user interface for visualizing said environment on a first display associated with a first user;

generating a metaphorical first user object for navigating and interacting in three dimensions within said environment via navigational and interactional inputs, respectively, from said first user;

generating a metaphorical second user object for navigating and interacting in three dimensions within said environment via navigational and interactional inputs, respectively, from a second user via said second processor connected over a network to said first processor;

implementing a modification of a lower-level component of said program without modifying said external API, said external API being isolated from said modification by said internal API;

integrating a third object selected from the group consisting of a rich media object, a network resource, a hypermedia object and a markup language object into said environment; and interacting said first user object with said third object in response to a first interactional input from said first user, and the program providing instructions for said second processor to perform operations of:

generating a second three-dimensional (3D) graphical user interface for visualizing said environment on a second display associated with said second user;

generating said metaphorical first user object for navigating and interacting in three dimensions within said environment via said navigational and interactional inputs, respectively, from said first user via said first processor over said network;

generating said metaphorical second user object for navigating and interacting in three dimensions within said environment via navigational and interactional inputs, respectively, from said second user; and interacting said first user object with said third object in response to said first interactional input from said first user via said first processor over said network.

10. The computer program of any of claim 2, 3, 5 or 9, wherein said third object is a markup language object.

11. The program of claim 10, further comprising instructions for said first processor to perform additional operation of:

interacting said second user object with said third object in response to a third interactional input from said second user via said second processor associated with said second user over said network.

12. The program of claim 10 wherein further comprising instruction for said first processor to perform additional operation of:
   integrating one or more resources selected from the group consisting of a network resource and a rich media object into said environment.

13. The program of claim 12, further comprising instructions for said first processor to perform additional operation of:
   interacting said first user object with said resource in response to a fourth interactional input from said first user.

14. The program of claim 13, further comprising instructions for said first processor to perform additional operation of:
   interacting said second user object with said resource in response to a fifth interactional input from said second user via said second processor over said network.

15. The program of claim 14, further comprising instructions for said first processor to perform additional operation of:
   reconfiguring said resource in response to each of said fourth interactional input from said first user and said fifth interactional input from said second user.

16. The program of claim 12, wherein said resource is a product that is on sale, and said program provides instructions for said first processor to perform additional operation of:
   processing a contract of sale with said first user in response to a first input from said first user.

17. The program of claim 12, wherein said resource is a product that is on sale, and said program provides instructions for said first processor to perform additional operation of:
   processing a first bid from the first user in response to a first input from said first user.

18. The program of claim 17, further comprising instructions for said first processor to perform additional operations of:
   processing a second bid from said second user in response to a second input from said second user via said second processor over said network;
   determining which of said first and second bids is a highest bid; and
   processing a contract of sale with one of said first user and said second user depending which of said first and second bids is said highest bid.

19. The program of claim 10 further comprising instructions for said first processor to perform additional operation of:
   generating a metaphorical, executable hyperlink within said environment.

20. The program of claim 19, wherein further comprising instructions for said first processor to perform additional operation of:
   hyperlinking to another location in response to a first input at said hyperlink from said first user.

21. The program of claim 20, further comprising instructions for said second processor to perform additional operation of:
   hyperlinking to said location in response to said input at said hyperlink from said first user via said first processor over said network.

22. The program of claim 20, further comprising instructions for said first processor to perform additional operation of:
   hyperlinking to said location in response to a second input at said hyperlink from said second user via said second processor over said network.

23. The program of claim 10, further comprising instructions for said first processor to perform additional operation of:
   flying said first user object to another location on a continuous course within said environment in response to a first navigational input from said first user.

24. The program of claim 10, further comprising instructions for said first processor to perform additional operation of:
   warping said first user object directly to another location within said environment in response to a first navigational input from said first user.

25. The program of claim 10, further comprising instructions for said first processor to perform additional operation of:
   generating a bot object associated with a program component for interacting with said first user object.

26. The program of claim 25, further comprising instructions for said first processor to perform additional operation of:
   interacting said first user object with said bot object in response to a fourth interactional input from said first user.

27. The program of claim 25, further comprising instructions for said first processor to perform additional operation of:
   interacting said first user object with said bot object in response to a fourth interactional input from said program component.

28. The program of claim 25, further comprising instructions for said first processor to perform additional operation of:
   interacting said second user object with said bot object in response to a fourth interactional input from said second user via said second processor over said network.

29. The program of claim 10, further comprising instructions for said first processor to perform additional operation of:
   setting a first point-of-view for said first user in response to a first point-of-view input from said first user.

30. The program of claim 10, further comprising instructions for said first processor to perform additional operations of:
   setting a first point-of-view for said first user in response to a first point-of-view input from said first user; and
   setting a second point-of-view for said second user in response to a second point-of-view input from said second user via said second processor over said network.

31. The program of claim 30, wherein the said first point-of-view is diferent than said second point-of-view.

32. The program of claim 1, further comprising instructions for said first processor to perform additional operation of:
   generating a viewing screen within said enviriment for display images, wherein said third object is makeup language object.

33. The program of any claim 3, 5 or 9, further comprising instructions for said first processor to perform additional operation of:
   generating a viewing screen within said enviornment for displaying images, wherein said third object is a markup language object.

34. The program of claim 33, further comprising instructions for said first processor to perform additional operation of:

setting a first point-of-view at said viewing screen for said first user in response to a first point-of-view input from said first user.

35. The program of claim 34, further comprising instructions for said processor to perform additional operation of:

setting a second point-of-view at said viewing screen for said second in response to a second point-of-view input from said second user.

36. The program of claim 35, wherein said first point-of-view is different than said second point-of-view.

37. The program of any claim 5 or 9, wherein said operation of interacting said first and second users conveys a proxy expression from said first user object to said second user and wherein said third object is a markup language object.

38. The program of claim 10, further comprising insturctions for said first processor to perform additional operation of:

attaching an executable file to an email from said first user to a third user, and instructions for a third processor associated with said third user to perform operation; and automatically downloading said program to a memory space associated with said third processor upon execution of said executable file by said third user.

39. The program of claim 38, wherein said executable file comprises less than 100 kilobytes.

40. The program of claim 10, further comprising instructions for said first processor to perform additional operations of:

detecting a new version of a component of said program; and automatically modifying said program to replace an old version of said component with said new version.

41. The program of claim 10, further comprising instructions for said first processor to perform additional operation of:

modifying said program in response to a configurational input from said first user.

42. The program of claim 10, further comprising instructions for said first processor to perform additional operations of:

detecting a new component; and automatically adding said new component to said program.

43. The program of claim 10, wherein said program is entirely component-based.

44. The program of claim 10, wherein said third object is an HTML object.

45. The program of claim 10, further comprising an XML handler including a handler data stack, and instructions for said first processor to perform additional operation of:

adding a new handler to said handler data stack in such a way as to be accessible by a different handler.

46. The program of claim 10, further comprising instructions for said first processor to perform additional operation of:

generating an agent object associated with said first user object for automatically performing one or more tasks on behalf of said first user object.

47. The program of claim 10, further comprising instructions for said first processor to perform additional operation of:

generating an executable widget representation that exhibits 3D behavior in response to a first executional input from said first user.

48. The program of claim 10, further comprising a communicator component, and instructions for said first processor to perform additional operations of:

communicating a message from a third user to said first user via a third processor associated with said third user over said network using a first protocol available to said third processor; and generating a representation of said message on said first display using a second protocol available to said first processor, but not available to said third processor.

49. The program of claim 48, further comprising instructions for said first processor to perform additional operations of:

storing information about protocol capabilities of said third user in a memory associated with said first processor; and automatically recalling said information when another communication occurs between said first user and said third user.

50. The program of claim 10, further comprising instructions for said processor to perform additional operations of:

browsing a two-dimensional (2D) markup language site connected to said network; and integrating a 2D markup language object associated with said 2D markup language site into said environment.

51. The program of claim 50, further comprising instructions for said first processor to perform additional operation of:

generating a 3D representation of said 2D markup language object on said first display.

52. The program of claim 51, further comprising instructions for said first processor to perform additional operations of:

integrating a 3D site corresponding to said 2D markup language site into said environment; and generating said 3D site on said first display.

53. The program of claim 10, further comprising instructions for said first processor to perform additional operation of:

communicating with one or more servers connected to said network.

54. The program of any of claim 3, 5 or 9, further comprising instructions for said first processor to perform additional operation of:

communicating with an interactivity server for enabling said first user object and said second user object to interact, wherein said third object is a markup language object.

55. The program of claim 10, further comprising instructions for said first processor to perform additional operation of:

communicating with a community server for associating said first user with information identifying and related to said first user.

* * * * *